US012424140B2

(12) United States Patent
Wu

(10) Patent No.: US 12,424,140 B2
(45) Date of Patent: Sep. 23, 2025

(54) SPLICED DISPLAY SCREEN, AND DISPLAY METHOD, PARAMETER DETERMINATION METHOD AND CONTROL SYSTEM FOR THE SAME

(71) Applicant: BOE TECHNOLOGY GROUP CO., LTD., Beijing (CN)

(72) Inventor: Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/290,833

(22) PCT Filed: Sep. 30, 2022

(86) PCT No.: PCT/CN2022/123252
§ 371 (c)(1),
(2) Date: Jan. 22, 2024

(87) PCT Pub. No.: WO2024/065668
PCT Pub. Date: Apr. 4, 2024

(65) Prior Publication Data
US 2025/0095534 A1 Mar. 20, 2025

(51) Int. Cl.
*G09G 3/20* (2006.01)

(52) U.S. Cl.
CPC ..... *G09G 3/2074* (2013.01); *G09G 2300/026* (2013.01); *G09G 2320/0666* (2013.01); *G09G 2320/0686* (2013.01)

(58) Field of Classification Search
CPC ......... G09G 3/2074; G09G 2320/0686; G09G 2300/026
See application file for complete search history.

(56) References Cited

U.S. PATENT DOCUMENTS

2024/0177646 A1* 5/2024 Wang .................. G09G 3/3208

FOREIGN PATENT DOCUMENTS

CN 101778232 A 7/2010
CN 104299563 A 1/2015
CN 105096829 A 11/2015
CN 109003568 A 12/2018
(Continued)

*Primary Examiner* — Priyank J Shah
(74) *Attorney, Agent, or Firm* — HOUTTEMAN LAW LLC

(57) ABSTRACT

A spliced display screen, and a display method, a parameter determination method and a control system for a spliced display screen are provided. The spliced display screen includes display panels spliced together. The method includes: determining initial gray scale compensation data according to first gray scale data of a pixel in current frame image data and a gray scale compensation data table, the gray scale compensation data table includes a temperature adjustment parameter configured for the spliced display screen, which varies with the spliced display screen; determining a gray scale compensation coefficient of each display region of at least one display panel; determining target gray scale compensation data according to the gray scale compensation coefficient and the initial gray scale compensation data; and performing a gray scale compensation on the current frame image data according to the target gray scale compensation data to obtain compensated frame image data.

20 Claims, 11 Drawing Sheets

(56) References Cited

FOREIGN PATENT DOCUMENTS

| | | | |
|---|---|---|---|
| CN | 109166526 | A | 1/2019 |
| CN | 111161691 | A | 5/2020 |
| CN | 111816112 | A | 10/2020 |
| CN | 112863439 | A | 5/2021 |
| CN | 113192469 | A | 7/2021 |
| CN | 114203086 | A | 3/2022 |
| CN | 114898717 | A | 8/2022 |
| KR | 20160046606 | A | 4/2016 |
| KR | 20190048477 | A | 5/2019 |

* cited by examiner

SPLICED DISPLAY SCREEN, AND DISPLAY METHOD, PARAMETER DETERMINATION METHOD AND CONTROL SYSTEM FOR THE SAME

CROSS-REFERENCE TO RELATED APPLICATIONS

The present disclosure is a National Phase Application filed under 35 U.S.C. 371 as a national stage of PCT/CN2022/123252 filed on Sep. 30, 2022, the contents of which are incorporated herein by reference in their entirety.

TECHNICAL FIELD

The present disclosure relates to the field of display technology, in particular to a spliced display screen, a display method for a spliced display screen, a parameter determination method for a spliced display screen and a control system for a spliced display screen.

BACKGROUND

With the rapid development of a sub-millimeter light-emitting diode (mini LED) display technology, the mini LED display product has begun to be applied to the field of a high definition display of a super large display screen. In an operating process of the mini LED, because the spliced display screen is generally lit for a long time, a large amount of heat energy generated by electronic components cannot be dissipated in time, the temperature of the screen may be increased, and a temperature difference between regions of the screen occurs. The luminous efficiency of the screen is reduced as the temperature rises, so that a visual afterimage appears if the display picture of the screen is switched. However, a gray scale compensation algorithm developed in the conventional technology is only suitable for a single spliced display screen, without universality.

SUMMARY

The present disclosure is directed to at least solve one of the technical problems in the prior art, and provides a spliced display screen, a display method for a spliced display screen, a parameter determination method for a spliced display screen and a control system for a spliced display screen.

In a first aspect, an embodiment of the present disclosure provides a display method for a spliced display screen, wherein the spliced display screen includes a plurality of display panels spliced with each other, at least one display panel includes a plurality of display regions; and the method includes: sampling frame image data in a video frame sequence according to a preset sequence order, and after sampling each frame of frame image data, performing a gray scale compensation on the sampled current frame image data, so as to obtain the compensated frame image data; the performing the gray scale compensation on the sampled current frame image data, so as to obtain the compensated frame image data includes: determining initial gray scale compensation data according to first gray scale data of a pixel in the current frame image data and a pre-generated gray scale compensation data table; wherein the gray scale compensation data table includes compensation gray scale data of gray scales in a preset gray scale range and a pre-configured temperature adjustment parameter of the spliced display screen, and the temperature adjustment parameter configured for the spliced display screen varies with the spliced display screen; determining a gray scale compensation coefficient of each display region; determining target gray scale compensation data according to the gray scale compensation coefficient and the initial gray scale compensation data; and performing the gray scale compensation on the current frame image data according to the target gray scale compensation data to obtain the compensated frame image data.

In some implementations, the determining initial gray scale compensation data for a pixel includes: processing sub-pixels of the pixel in the current frame image data according to a pre-stored ratio of heating capacities of the sub-pixels of the pixel, to determine the first gray scale data; and searching for the compensation gray scale data corresponding to the first gray scale data from the gray scale compensation data table according to the first gray scale data, and adjusting the compensation gray scale data by using the temperature adjustment parameter, to determine the initial gray scale compensation data.

In some implementations, the determining a gray scale compensation coefficient of each display region includes: performing a region division on at least one display panel according to preset resolution information of the display panel to obtain each display region; determining time domain weighted gray scale data of the display region according to the first gray scale data of each display region and a pre-configured time domain weighted coefficient corresponding to at least one frame of historical frame image data; wherein the time domain weighted gray scale data represents an influence of the at least one frame of historical frame image data of the display region on a gray scale of the current frame image data; determining spatial domain weighted gray scale data of the display region according to a preset convolution kernel and the time domain weighted gray scale data; wherein the convolution kernel includes a coefficient representing a thermal diffusion of each display region within a preset region into a surrounding region; and the spatial domain weighted gray scale data represents an influence of other surrounding display regions on a gray scale of the display region with the display region serving as a center; and determining the gray scale compensation coefficient of the display region according to the spatial domain weighted gray scale data.

In some implementations, the determining time domain weighted gray scale data of the display region according to the first gray scale data of each display region and a pre-configured time domain weighted coefficient corresponding to at least one frame of historical frame image data includes: determining region gray scale data of each display region according to the first gray scale data of the pixel and each display region; determining time domain temperature influence data according to the region gray scale data and a pre-configured first non-linear factor; and weighting the time domain temperature influence data corresponding to each frame of historical frame image data by using the time domain weighted coefficient corresponding to each frame of historical frame image data to obtain the time domain weighted gray scale data of the display region.

In some implementations, the determining spatial domain weighted gray scale data of the display region according to a preset convolution kernel and the time domain weighted gray scale data includes: weighting the time domain weighted gray scale data of each display region in the preset region according to the convolution kernel, and determining the spatial domain weighted gray scale data of the display region.

In some implementations, the determining the gray scale compensation coefficient of the display region according to the spatial domain weighted gray scale data includes: taking a difference between 1 and the spatial domain weighted gray scale data as the gray scale compensation coefficient of the display region.

In some implementations, the determining target gray scale compensation data according to the gray scale compensation coefficient and the initial gray scale compensation data includes: taking the gray scale compensation coefficient of the display region as the gray scale compensation coefficient of a pixel in the display region; and determining the target gray scale compensation data of the pixel according to the gray scale compensation coefficient and the initial gray scale compensation data of the pixel; and the performing the gray scale compensation on the current frame image data according to the target gray scale compensation data to obtain the compensated frame image data includes: processing a first sub-pixel of the pixel by using the target gray scale compensation data to obtain the compensated frame image data.

In a second aspect, an embodiment of the present disclosure further provides a parameter determination method for a spliced display screen, including: determining at least one of following parameters configured for the spliced display screen by using a customized reference spliced display screen: a ratio of heating capacities of sub-pixels in a pixel; a gray scale compensation data table; a first non-linear factor; a time domain weighted coefficient; and a convolution kernel.

In some implementations, determining the ratio of heating capacities of the sub-pixels in the pixel includes: lighting the reference spliced display screen according to sub-colors of the sub-pixels, respectively, to obtain a temperature change of the reference spliced display screen for each sub-color; and normalizing the temperature change of the reference spliced display screen for each sub-color to obtain the ratio of heating capacities of the sub-pixels.

In some implementations, determining the gray scale compensation data table includes: lighting the reference spliced display screen according to a first gray scale, and determining a first average temperature of the reference spliced display screen; traversing gray scales in a preset gray scale range at the first average temperature, and determining first brightness information at each gray scale; lighting the reference spliced display screen according to a second gray scale, and determining a second average temperature of the reference spliced display screen; traversing the gray scales in the preset gray scale range at the second average temperature, and determining second brightness information at each gray scale; after the first brightness information and the second brightness information meet a first preset condition, determining a first target gray scale corresponding to the first brightness information and a second target gray scale corresponding to the second brightness information, and taking a difference between the first target gray scale and the second target gray scale as compensation gray scale data of the second target gray scale; determining a lowest temperature of the spliced display screen during the spliced display screen being lit according to the first gray scale; determining a highest temperature of the spliced display screen during the spliced display screen being lit according to the second gray scale; and determining the temperature adjustment parameter according to the lowest temperature, the highest temperature, the first average temperature and the second average temperature.

In some implementations, the determining the temperature adjustment parameter according to the lowest temperature, the highest temperature, the first average temperature and the second average temperature includes: taking a ratio of a first difference, between the highest temperature and the lowest temperature, to a second difference, between the second average temperature and the first average temperature, as the temperature adjustment parameter.

In some implementations, determining the first non-linear factor includes: lighting a first region of the reference spliced display screen according to the first gray scale and a second region of the reference spliced display screen according to the second gray scale, wherein the first region and the second region are different from each other; and after a preset time duration, lighting the first region and the second region according to the second gray scale, adjusting the first non-linear factor, and determining the adjusted first non-linear factor after a display picture of the first region is consistent with a display picture of the second region.

In some implementations, determining the time domain weighted factor includes: determining the time domain weighted coefficient according to time sequence information of a preset quantity of frames of historical frame image data and a preset second non-linear factor.

In some implementations, determining the convolution kernel includes: acquiring initial temperatures of P×P display panels in the reference spliced display screen before the P×P display panels are lit, wherein P is a positive integer; performing a region division on at least one display panel, and lighting a target display panel at a center of the P×P display panels according to the second gray scale to obtain a third average temperature of each display region; taking a difference between the third average temperature and the initial temperature as a temperature change of the display region; and normalizing a ratio of the temperature change of each display region to the maximum temperature change of the display region to obtain the convolution kernel.

In a third aspect, an embodiment of the present disclosure further provides a spliced display screen, including a gray scale compensation circuit configured to perform a gray scale compensation on display data in the spliced display screen, wherein the spliced display screen includes a plurality of display panels spliced with each other; at least one display panel includes a plurality of display regions; wherein the gray scale compensation circuit includes a sampling module and a processor; the sampling module is configured to sample frame image data in a video frame sequence according to a preset sequence order to obtain current frame image data; and the processor is configured to determine initial gray scale compensation data according to first gray scale data of a pixel in the current frame image data and a pre-generated gray scale compensation data table, wherein the gray scale compensation data table includes compensation gray scale data of gray scales in a preset gray scale range and a pre-configured temperature adjustment parameter of the spliced display screen, the temperature adjustment parameter configured for the spliced display screen varies with the spliced display screen; determine a gray scale compensation coefficient of each display region; determine target gray scale compensation data according to the gray scale compensation coefficient and the initial gray scale compensation data; and perform the gray scale compensation on the current frame image data according to the target gray scale compensation data to obtain compensated frame image data.

In some implementations, the processor includes an initial gray scale determination module, a compensation coefficient determination module and a gray scale compensation module; the initial gray scale determination module is configured to determine the initial gray scale compensation data according to the first gray scale data of the pixel in the current frame image data and the pre-generated gray scale compensation data table; the compensation coefficient determination module is configured to determine the gray scale compensation coefficient for each display region; and the gray scale compensation module is configured to determine the target gray scale compensation data according to the gray scale compensation coefficient and the initial gray scale compensation data; and perform the gray scale compensation on the current frame image data according to the target gray scale compensation data to obtain the compensated frame image data.

In some implementations, the initial gray scale determination module includes a first gray scale determination unit and an initial gray scale determination unit; for determining the first gray scale data of the pixel, the first gray scale determination unit is configured to process sub-pixels of the pixel in the current frame image data according to a pre-stored ratio of heating capacities of the sub-pixels, to determine the first gray scale data; and for determining the initial gray scale compensation data of the pixel, the initial gray scale determination unit is configured to search for the compensation gray scale data corresponding to the first gray scale data from the gray scale compensation data table according to the first gray scale data, and adjust the compensation gray scale data by using the temperature adjustment parameter, to determine the initial gray scale compensation data.

In some implementations, the compensation coefficient determination module includes a region division unit, a time domain statistical unit, a spatial domain statistical unit and a compensation coefficient determination unit; for determining the gray scale compensation coefficient of each display region, the region division unit is configured to perform a region division on at least one display panel according to preset resolution information of the display panel to obtain each display region; the time domain statistical unit is configured to determine time domain weighted gray scale data of the display region according to the first gray scale data of each display region and a pre-configured time domain weighted coefficient corresponding to at least one frame of historical frame image data; wherein the time domain weighted gray scale data represents an influence of the at least one frame of historical frame image data of the display region on a gray scale of the current frame image data; the spatial domain statistical unit is configured to determine spatial domain weighted gray scale data of the display region according to a preset convolution kernel and the time domain weighted gray scale data; wherein the convolution kernel includes a coefficient representing a thermal diffusion of each display region within a preset region into a surrounding region, and the spatial domain weighted gray scale data represents an influence of other surrounding display regions on a gray scale of the display region with the display region serving as a center; and the compensation coefficient determination unit is configured to determine the gray scale compensation coefficient of the display region according to the spatial domain weighted gray scale data.

In some implementations, the time domain statistical unit includes a region gray scale determination sub-unit, a non-linear processing sub-unit, and a time domain weighted sub-unit; the region gray scale determination sub-unit is configured to determine region gray scale data of each display region according to the first gray scale data of the pixel and each display region; the non-linear processing sub-unit is configured to determine time domain temperature influence data according to the region gray scale data and a pre-configured first non-linear factor; and the time domain weighted sub-unit is configured to weight the time domain temperature influence data corresponding to each frame of historical frame image data by using the time domain weighted coefficient corresponding to each frame of historical frame image data to obtain the time domain weighted gray scale data of the display region.

In some implementations, the spatial domain statistical unit is configured to weight the time domain weighted gray scale data of each display region in the preset region according to the convolution kernel, to determine the spatial domain weighted gray scale data of the display region.

In some implementations, the compensation coefficient determination unit is configured to take a difference between 1 and the spatial domain weighted gray scale data as the gray scale compensation coefficient of the display region.

In some implementations, the gray scale compensation module includes a target gray scale determination unit and a gray scale compensation unit; the target gray scale determination unit is configured to take the gray scale compensation coefficient of the display region as the gray scale compensation coefficient of a pixel in the display region and determine the target gray scale compensation data of the pixel according to the gray scale compensation coefficient and the initial gray scale compensation data of the pixel; and the gray scale compensation unit is configured to process a first sub-pixel of the pixel by using the target gray scale compensation data to obtain the compensated frame image data.

In a fourth aspect, an embodiment of the present disclosure further provides a control system for a spliced display screen, including the spliced display screen in the above embodiment and a playing control module.

In some implementations, the playing control module is configured to adjust programs in a playing control interface in response to a management operation on the programs in the playing control interface, obtain edited programs in response to an editing operation on the programs in the playing control interface, and upload the edited programs to the spliced display screen.

DETAIL DESCRIPTION OF EMBODIMENTS

Figure 1:
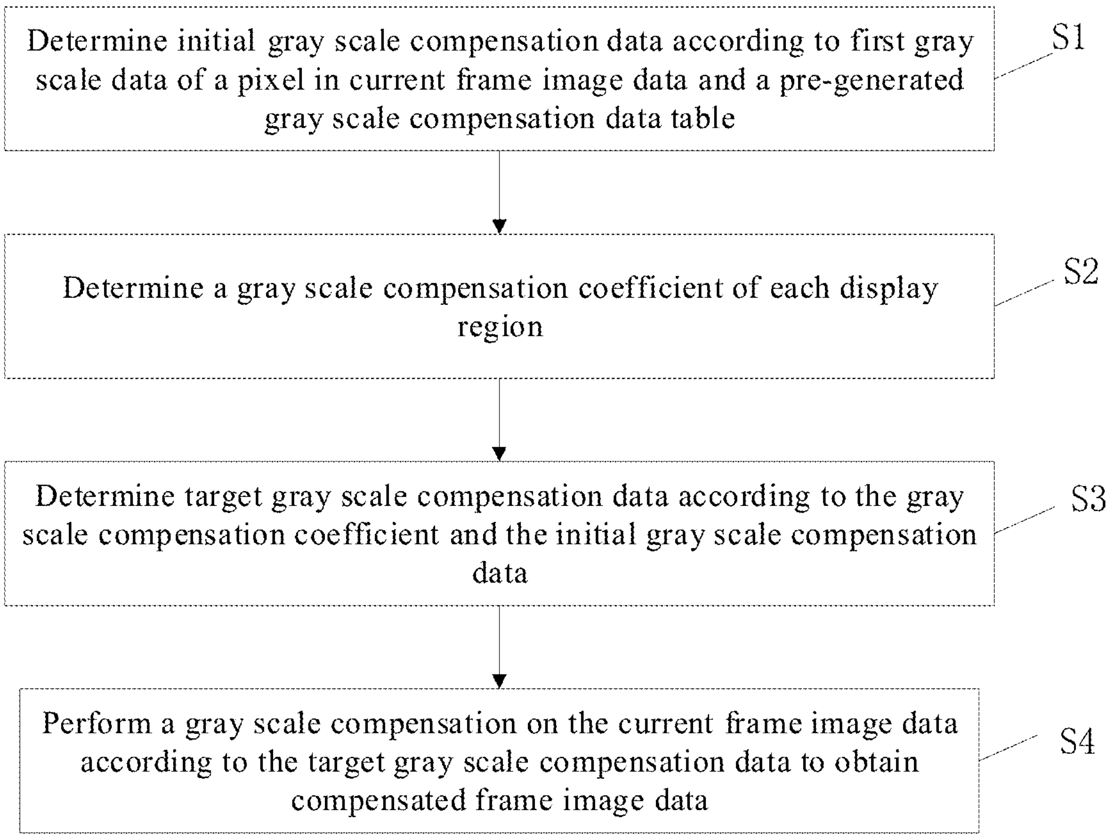
FIG. 1 is a flowchart of a display method for a spliced display screen according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. Components of the embodiments of the present disclosure, as generally described and illustrated in the drawings herein, could be arranged and designed in a wide variety of different configurations. Thus, the following detailed description of the embodiments of the present disclosure in the drawings is not intended to limit the protective scope of the present disclosure, but is merely representative of selected embodiments of the present disclosure. All other embodiments, which can be derived by a person skilled in the art from the described embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper/on/above”, “lower/under/below”, “left”, “right”, and the like are used only for indicating relative positional relationships, and when the absolute position of an object being described is changed, the relative positional relationships may also be changed accordingly.

Reference to “a plurality or a number” in this disclosure means two or more. The term “and/or” describes an association relationship of associated objects, and indicates that three relationships may exist, for example, A and/or B may indicate: A exists alone, A and B exist simultaneously, and B exists alone. The character “/” generally indicates that the associated objects before and after the “/” are in an “or” relationship.

It is found through researches that the temperature of a screen is increased and the luminous efficiency of an LED is reduced due to a large amount of heat energy generated by electronic components in the operating process of a spliced display screen such as a mini LED spliced screen. Since gray scales displayed in display regions are not uniform in the entire screen, there is a difference between the brightness of red channels R in the display regions displaying a relatively high gray scale and a relatively low gray scale respectively for a long time. In this case, if different regions display a same gray scale, cyan and red spots (i.e., visual afterimage) appear on a displayed picture, and such phenomenon of the visual afterimage appearing seriously affects the consistency of the displayed picture. In addition, the existing spliced display screens are diversified, different spliced display screens have different resolutions, the gamma characteristics and the maximum peak brightness set for different spliced display screens are uncertain, and the afterimage is inconsistent for different spliced display screens or a same spliced display screen with different peak brightness, resulting in corresponding compensation values being inconsistent. Therefore, if the gray scale compensation is performed on the spliced display screens under the influence of the gamma characteristics and the maximum peak brightness, different spliced display screens correspond to different gray scale compensation algorithms, a single gray scale compensation algorithm has no universality on the spliced display screens, and each spliced display screen corresponds the corresponding gray scale compensation algorithm in an application stage, resulting in a relatively complex test and preparation process for technicians, the cost of manpower and material resources in a design stage is increased.

In view of above, an embodiment of the present disclosure provides a display method for a spliced display screen, in which frame image data in a video frame sequence is sampled according to a preset sequence order, and after each frame of frame image data is sampled, a gray scale compensation is performed on the sampled current frame image data, so as to obtain the compensated frame image data. In the process of performing the gray scale compensation on the sampled current frame image data, the compensation processing is performed by using data in a pre-generated gray scale compensation table, wherein the pre-generated gray scale compensation table includes compensation gray scale data of each gray scale in a preset gray scale range and a pre-configured temperature adjustment parameter of the spliced display screen. Specially, the temperature adjustment parameter configured for the spliced display screen in the embodiment of the present disclosure varies with the spliced display screen, and the temperature adjustment parameter is irrelevant to the gamma characteristic and the maximum peak brightness of the spliced display screen. That is, in the embodiment of the present disclosure, the compensation processing can be performed on gray scales of different spliced display screens by only adjusting the temperature adjustment parameter, thereby realizing that the display method for the spliced display screen is applicable to various spliced display screens. Thus, the display method for the spliced display screen provided by the embodiment of the present disclosure has universality on the spliced display screens, the gray scale compensation on any spliced display screen can be realized only by adjusting the temperature adjustment parameter of the corresponding spliced display screen before the display method is applied, and the efficiency of the overall processing flow in a development and deployment stage for the technical personnel is improved.

Here, the preset sequence order may specifically be an order of playing the video frame sequence on the spliced display screen. A mode for sampling the frame image data in the video frame sequence may be a continuous sampling mode or a frame skipping mode, and the specific number of frames to be skipped over may be set empirically, which is not limited in this disclosure.

It should be noted that, for the sampled frame image data, the current frame image data is the frame image data acquired from the video frame sequence at a current moment according to the preset sequence order, i.e., is a current frame of frame image data. The frame image data sampled before the current moment is denoted as historical frame image data, i.e., a historical frame of frame image data.

A sliding window is preset, and has a length of T sampled frames, each of the T sampled frames is a historical frame before the current frame. The frame image data in the video frame sequence is sampled uniformly. For example, the frame image data is sampled one frame every a certain number of frames.

The spliced display screen may be a mini LED display screen, which is also called an MLED display screen for short.

The specific process of performing the gray scale compensation on the sampled current frame image data to obtain the compensated frame image data will be described below in detail. The spliced display screen includes a plurality of display panels which are spliced together, and at least one display panel includes a plurality of display regions. FIG. 1 is a flowchart of a display method for a spliced display screen according to an embodiment of the present disclosure. As shown in FIG. 1, the method includes following steps S1 to S4.

In the step S1, initial gray scale compensation data is determined according to first gray scale data of a pixel in the current frame image data and a pre-generated gray scale compensation data table.

The frame image data includes gray scale data of the pixel in a frame image, and similarly, the current frame image data includes first gray scale data of the pixel in a current frame image.

The first gray scale data of the pixel may be directly obtained, or may be determined based on pixel information of sub-pixels of the pixel. For the first gray scale data of the pixel being directly acquired, since the pixel in the image data is a signal driven by a current, the first gray scale data corresponds to an intensity of the signal, after the current frame image data is acquired, the first gray scale data of the pixel can be directly acquired according to a detected intensity of the signal of the pixel in the current frame image data. For the first gray scale data of the pixel being determined based on pixel information of sub-pixels of the pixel, the sub-pixels of the pixel in the current frame image data are processed according to a pre-stored ratio of heating capacities of the sub-pixels, to determine the first gray scale data.

It should be noted that a pixel in an image generally includes three sub-pixels, for example, a red sub-pixel, a green sub-pixel, and a blue sub-pixel. The red sub-pixel, the green sub-pixel and the blue sub-pixel correspond to three channels of the pixel respectively. That is, the red sub-pixel corresponds to a red channel R, the green sub-pixel corresponds to a green channel G, and the blue sub-pixel corresponds to a blue channel B. The pixel information of each sub-pixel may be a channel value of the channel corresponding to the sub-pixel, that is, a red channel value r corresponding to the red channel R, a green channel value g corresponding to the green channel G, and a blue channel value b corresponding to the blue channel B.

The ratio of heating capacities of the sub-pixels may be preset and can be directly obtained. The process of determining the ratio of heating capacities may be referred to following steps S11 to S12, and is not described in detail here.

Illustratively, the ratio of heating capacities of the red, green, and blue sub-pixels, i.e., R:G:B=reteR:reteG:reteB, is known, and channel values of the sub-pixels are r, g, and b, respectively. The sub-pixels of the pixel in the current frame image data are processed according to the pre-stored ratio of heating capacities of the sub-pixels in the pixel. For example, the channel values r, g and b of the sub-pixels are weighted according to R:G:B=reteR:reteG:reteB, to determine the first gray scale data $G_j$=reteR×r+reteG×g+reteB×b, "j" in the first gray scale data $G_j$ indicates the pixel in the current frame image data.

The gray scale compensation data table includes compensation gray scale data of gray scales in a preset gray scale range and a pre-configured temperature adjustment parameter of the spliced display screen, and the temperature adjustment parameter configured for the spliced display screen varies with the spliced display screen. The preset gray scale range is, for example, a pre-selected gray scale range from 0 to 255, the gray scale compensation data table includes gray scale compensation data $G_{max}$ respectively corresponding to gray scales of 0, 1 and . . . 255 in the gray scale range from 0 to 255. The temperature adjustment parameter α is related to a temperature change of the spliced display screen that is lit at different gray scales, and is to be determined by referring to the temperature change of another spliced display screen (i.e., a reference spliced display screen defined in the following description) that is lit at different gray scales. The reference spliced display screen may be used as a reference for a plurality of different spliced display screens for determining each parameter configured for each spliced display screen in advance, for example, including the gray scale compensation data table or the like.

The gray scale compensation data table may be generated in advance, and can be directly obtained in step S1. The process of generating the gray scale compensation data table may be referred to following steps S101 to S106 described below, and is not described in detail here.

For determining the initial gray scale compensation data $G_i^{max}$, in some implementations, the compensation gray scale data $G_{max\_j}$ corresponding to the first gray scale data $G_j$ is searched for from the gray scale compensation data table according to the first gray scale data $G_j$ of the $j^{th}$ pixel in the current frame image data, that is, the compensation gray scale data $G_{max\_j}$ corresponding to the first gray scale data $G_j$ is searched for from the gray scale compensation data $G_{max}$ corresponding to the gray scales in the following table 1, the compensation gray scale data $G_{max\_j}$ is adjusted by using the temperature adjustment parameter α uniquely corresponding to the spliced display screen, to determine the initial gray scale compensation data $C_i^{max}$ of the $j^{th}$ pixel, wherein "i" indicates the current frame image data, and specifically, as shown in following formula 1.

$$G_i^{max} = G_{max\_j} \times \alpha \qquad \text{Formula 1}$$

Here, "j" indicates the pixel in the current frame image data. For example, "j" may indicate any pixel in the current frame image data. Therefore, the initial gray scale compensation data of any pixel in the current frame image data can be determined according to the formula 1, and repeated descriptions are omitted.

In the step S2, a gray scale compensation coefficient of each display region is determined.

Specifically, the gray scale compensation coefficient of each display region may be determined according to following steps S21 to S24.

In the step S21, a region division is performed on at least one display panel according to preset resolution information of the display panel to obtain each display region.

In order to reduce the amount of computation and improve the data processing efficiency, the display panel may be partitioned (subjected to the region division), and the subsequent processing may be performed in units of each display region. The spliced display screen includes a plurality of display panels spliced with each other, and at least one display panel includes a plurality of display regions.

In an example that the spliced display screen includes N×N display panels each with a resolution of w×h, at least one display panel includes k×k display regions, where k may be equal to 3 or 5. The spliced display screen includes (k×M)×(k×N) display regions, and each display region has a resolution of $$\frac{w}{k} \times \frac{h}{k}.$$

In the step S22, time domain weighted gray scale data of each display region is determined according to the first gray scale data of each display region and a pre-configured time domain weighted coefficient corresponding to at least one frame of historical frame image data.

The time domain weighted gray scale data represents an influence of the at least one frame of historical frame image data of the display region on a gray scale of the current frame image data.

In some implementations, the first gray scale data of each display region and the pre-configured time domain weighted coefficient corresponding to the at least one frame of historical frame image data are used as input data of a first preset algorithm, so as to obtain the time domain weighted gray scale data of each display region output by the first preset algorithm. Here, the first preset algorithm may be a preset weighted sum algorithm. The time domain weighted coefficient corresponding to each frame of historical frame image data is predetermined and can be obtained directly. The process of determining the time domain weighted coefficient of each frame of historical frame image data is described in detail in the step S220 below, and is not described in detail here. It should be noted that all time domain weighted coefficients are added up to be a value of 1. That is, $\Sigma_{v=1}^{T} W_v = 1$ and $W_{v+1} \geq W_v$, $W_v$ represents the time domain weighted coefficient corresponding to the $v^{th}$ frame of history frame image data and T represents the $T^{th}$ frame of history frame image data.

In some implementations, for determining the time domain weighted gray scale data of each display region, specifically, region gray scale data of each display region is determined according to the first gray scale data of the pixel and each display region; time domain temperature influence data is determined according to the region gray scale data and a pre-configured first non-linear factor; and the time domain temperature influence data corresponding to each frame of historical frame image data is weighted by using the time domain weighted coefficient corresponding to each frame of historical frame image data, to obtain the time domain weighted gray scale data of the display region.

For determining the region gray scale data $G_O^{mean}$ of each display region O, specifically, normalization processing is performed on the first gray scale data $G_j$ of the pixel to obtain second gray scale data $G_j$ of the pixel, that is, $$G_j' = \frac{G_j}{\sum_j^n G_j},$$

wherein n represents the number of all pixels in the current frame image. The value of the second gray scale data $G_j'$ is between 0 and 1. Weighting processing is performed on the second gray scale data $G_j'$ of the pixel in the display region O. For example, an average value of the second gray scale data $G_j'$ of all pixels $$\left(\frac{w}{k} \times \frac{h}{k}\right)$$

in the display region O is calculated to obtain the region gray scale data $G_O^{mean}$ of the display region O, specifically by referring to following formula 2.

$$G_O^{mean} = \frac{1}{O1} \sum_j^{O1} G_j' \qquad \text{Formula 2}$$

O1 represents the number of pixels in the display region O. If j=O1, $G_{O1}'$ represents the second gray scale data of the $O1^{th}$ pixel in the display region O. The region gray scale data of any other display region may be determined according to the formula 2, and repeated description is omitted.

If the resolution of the spliced display screen is known as W×H, at least one display panel includes k×k display regions, $$\left(\frac{W \times k}{w} \times \frac{H \times k}{h}\right)$$

pieces of region gray scale data $G_O^{mean}$ are to be determined for each spliced display screen.

The determination process of the first non-linear factor b may be referred to the following detailed description of steps S22-1 to S22-2, which is not detailed here. A value of the first non-linear factor b is a floating point number in a range of [1,2]. For determining the time domain temperature influence data $Y_O$ of each display region O, specifically, an exponentiation is performed on the region gray scale data $G_O^{mean}$ of each display region O, to obtain the time domain temperature influence data $Y_O$ by referring to following formula 3, wherein a power exponent in the exponentiation is the first non-linear factor b.

$$Y_O = G_O^{mean^\wedge b} \quad \text{Formula 3}$$

The time domain temperature influence data of any other display region may be determined according to the formula 3, and repeated description is omitted.

The time domain temperature influence data $Y_O$ corresponding to each frame of historical frame image data is weighted by using the time domain weighted coefficient $W_v$ corresponding to each frame of historical frame image data to obtain the time domain weighted gray scale data $Y_{O\_i}$ of the display region, specifically by referring to following formula 4.

$$Y_{O\_i} = \sum_{v=1}^{T}(W_v \times Y_{O\_v}) = \sum_{v=1}^{T}\left(W_v \times G_{O\_v}^{mean^\wedge b}\right) \quad \text{Formula 4}$$

$Y_{O\_v}$ represents the time domain temperature influence data of the display region O in the $v^{th}$ frame of historical frame image data. The time domain weighted gray scale data of any other display region may be determined according to the formula 4, and repeated description is omitted.

Illustratively, T=1800 frames are customized, and a large number of historical frames are sampled for determining the time domain weighted gray scale data $Y_{O\_i}$ of the display region O of the current frame image data, so that the accuracy of the determined time domain weighted gray scale data $Y_{O\_i}$ can be improved, and the precision of subsequent gray scale compensation can be improved.

In the step S23, spatial domain weighted gray scale data of each display region is determined according to a preset convolution kernel and the time domain weighted gray scale data.

The spatial domain weighted gray scale data of the display region O represents an influence of other surrounding display regions A on a gray scale of the central display region O with the display region O serving as a center. The convolution kernel includes a coefficient representing a thermal diffusion of each display region within a preset region into a surrounding region. The convolution kernel is generated in advance and can be directly obtained in the step S23, and the process of setting the convolution kernel may be referred to following steps S231 to S234, and is not described in detail here.

Figure 2A:
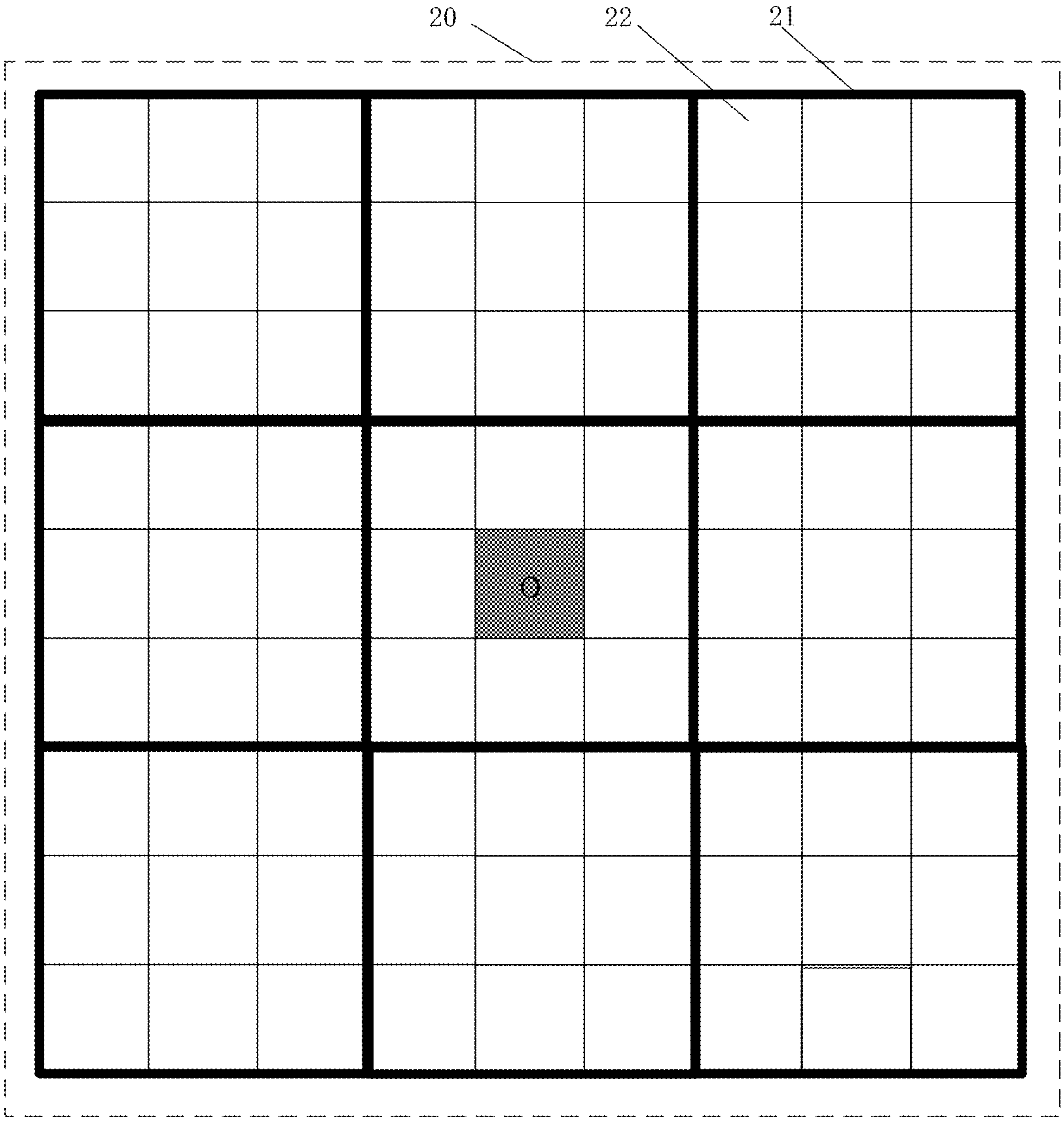
FIG. 2*a* and FIG. 2*b* are schematic diagrams respectively illustrating that a central display region is located at different positions of a spliced display screen according to an embodiment of the present disclosure.
Figure 2B:
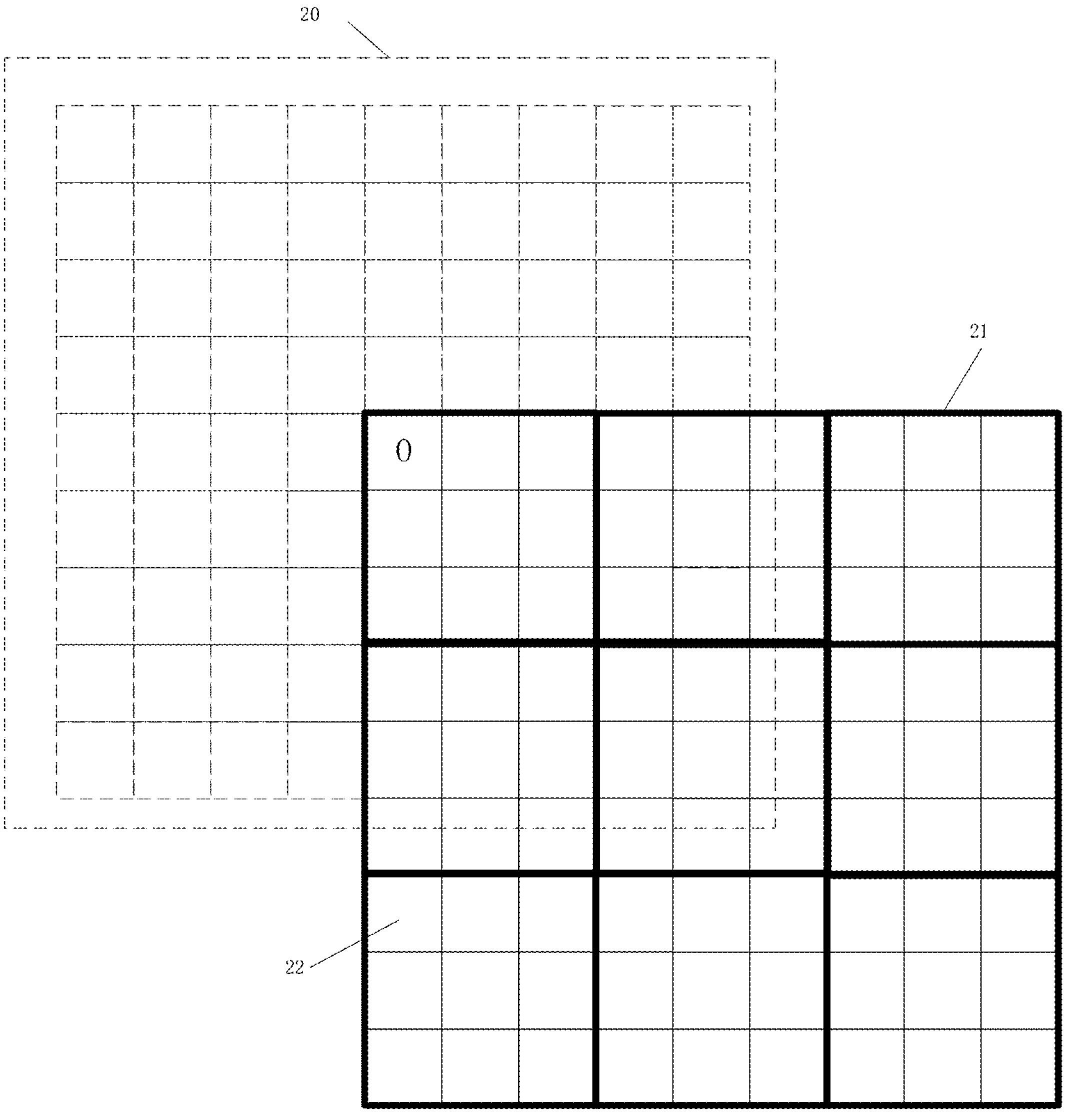

FIG. 2*a* and FIG. 2*b* are schematic diagrams respectively illustrating that a central display region is located at different positions of a spliced display screen according to an embodiment of the present disclosure. In an example that the preset region 20 includes 3×3 display panels 21, at least one display panel 31 includes 3×3 display regions 22. The central display region O may be located in a middle region of the 3×3 display panels 21 (e.g., a gray rectangular frame as shown in FIG. 2*a*), as shown in FIG. 2*a*; alternatively, the central display region O may be located at an edge region of the 3×3 display panels (e.g., a rectangular frame not filled with gray color as shown in FIG. 2*b*), as shown in FIG. 2*b*. The regions surrounding the central display region O are all other display regions A.

It should be noted that the central display region O being located at a center of the preset region does not means that the central display region O is necessarily located at a center of the spliced display screen. The preset region is at least partially located in the spliced display screen. As shown in FIG. 2*a*, the preset region is located in the spliced display screen (i.e. the 3×3 display panel 21). As shown in FIG. 2*b*, the preset region is partially located in the spliced display screen and partially located outside the spliced display screen.

In order to reduce the amount of computation and improve the data processing efficiency, convolution processing is performed on each display region as a unit to determine the spatial domain weighted gray scale data $Y_{O\_i}'$ of the display region O. Specifically, according to the convolution kernel, weighting processing is performed on the time domain weighted gray scale data of each display region in the preset region, to determine the spatial domain weighted gray scale data of the display region.

The number of coefficients in the convolution kernel is the same as the number of display regions in the preset region. The convolution kernel includes M×M coefficients, and each coefficient of the convolution kernel corresponds to the time domain weighted gray scale data of one corresponding display region in the preset region. In the example that the preset region includes 3× 3 display panels, and at least one display panel includes 3×3 display regions, the preset region includes 9×9 display regions, and the convolution kernel includes 9×9 coefficients. The coefficient in the fifth row and fifth column of the 9×9 coefficients of the convolution kernel (which may be understood as the coefficient at the center) corresponds to the time domain weighted gray scale data $Y_{O\_i}$ of the central display region O within the preset region.

Figure 3A:
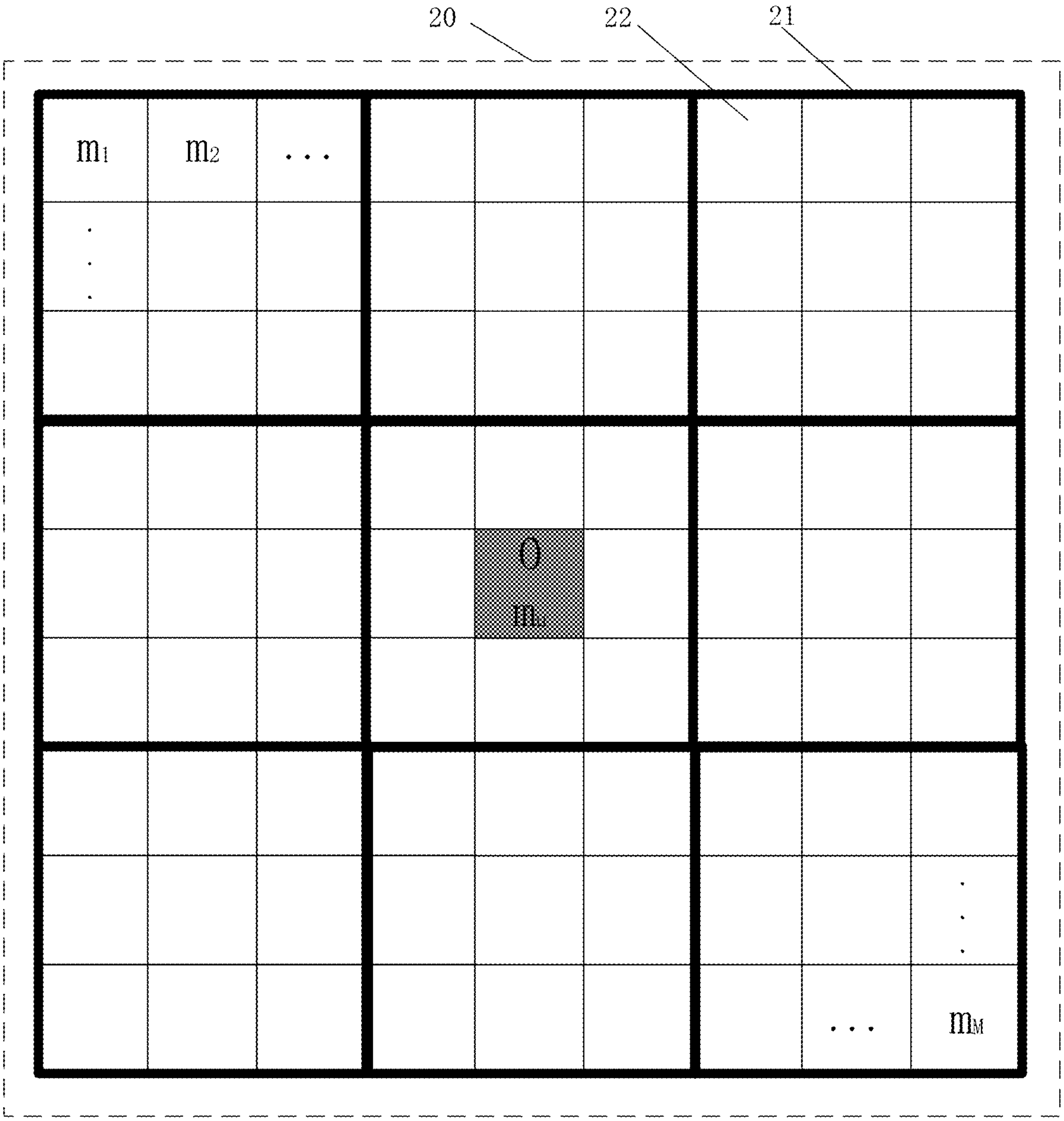
FIG. 3*a* is a schematic diagram of a weighting process with a convolution kernel according to an embodiment of the present disclosure.

FIG. 3*a* is a schematic diagram of a weighting process with a convolution kernel according to an embodiment of the present disclosure. As shown in FIG. 3*a*, the position of the central display region O is the same as the position of the central display region O shown in FIG. 2*a*, the convolution kernel includes coefficients $m_1, m_2, \ldots, m_M$, the coefficients in the convolution kernel are aligned with the display regions in the preset region, and the coefficient my at the central position is aligned with the central display region O in the preset region, so that each coefficient in the convolution kernel is multiplied by the time domain weighted gray scale data of the display region aligned with the coefficient to obtain a product, and all products are then added together to obtain the spatial domain weighted gray scale data $Y_{O\_i}'$ of the central display region O.

Figure 3B:
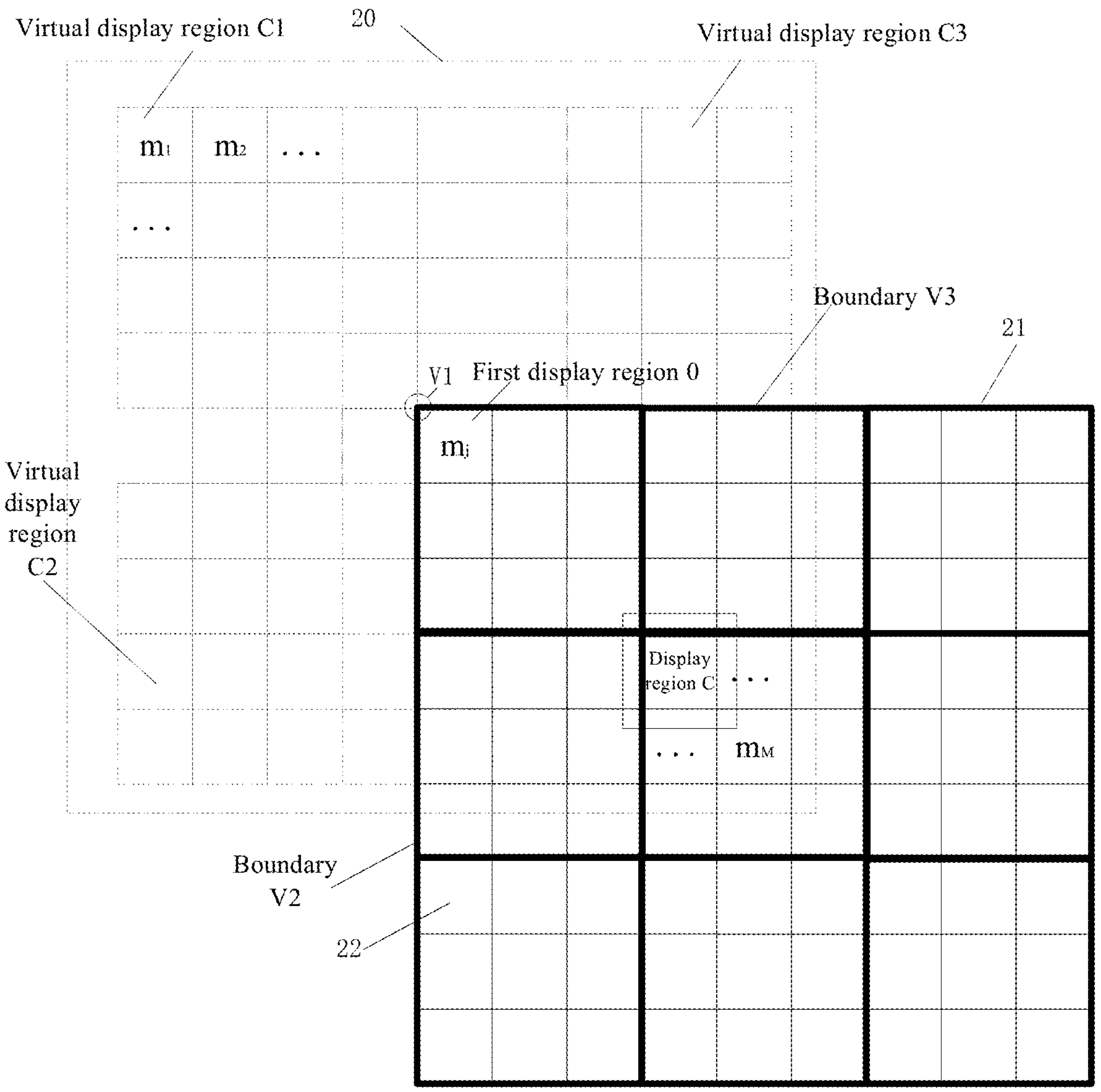
FIG. 3*b* is a schematic diagram of a weighting process with a convolution kernel according to an embodiment of the present disclosure.

FIG. 3*b* is a schematic diagram of a weighting process with a convolution kernel according to an embodiment of the present disclosure. As shown in FIG. 3*b*, the position of the central display region O (that is, the first display region) is the same as the position of the central display region O shown in FIG. 2*b*. The following description will be given by taking the center display region O being the display region (the first display region) in the first row and the first column of the spliced display screen as an example. The convolution kernel includes coefficients $m_1, m_2, \ldots, m_M$, the coefficients in the convolution kernel are aligned with the display regions in the preset region. It should be noted that a part of the display regions in the preset region are the display regions in the spliced display screen, and another part of the display regions are virtual display regions, not belong to the spliced display screen. For each virtual display region, there is no corresponding time domain weighted gray scale data, and therefore, each virtual display region is to be supplemented with the corresponding time domain weighted gray scale data. Specifically, with a boundary of the spliced display screen as a symmetry axis or with a vertex of the spliced display screen as a symmetry center, the time domain weighted gray scale data corresponding to each display region in the preset region in the spliced display screen is used as the time domain weighted gray scale data of any virtual display region symmetrical to the display region. Illustratively, as shown in FIG. 3*b*, by taking the display region C in the preset region of the spliced display screen as an example, the time domain weighted gray scale data of the display region C is used as the time domain weighted gray scale data of the virtual display region C1, the virtual display region C2 and the virtual display region C3 which are symmetric to the display region C. The display region C is symmetrical to the virtual display region C1 with respect to a vertex V1; the display region C is symmetric to the virtual display region C2 with respect to a boundary V2 of the spliced display screen, and the display region C is symmetric to the virtual display region C3 with respect to a boundary V3 of the spliced display screen. The other virtual display regions are supplemented with the time domain weighted gray scale data in the same way, and are not enumerated here. Then, the time domain weighted gray scale data in each display region is multiplied by a corresponding one of the coefficients $m_1, m_2, \ldots, m_M$ in the convolution kernel to obtain a product, and all the products are then added together to obtain the spatial domain weighted gray scale data $Y_{O\_i}'$ of the first display region.

In the process of filtering as above, a convolution step length is one display region, so that the compensation effect on the spliced display screen is more uniform.

Similarly, for the other display regions, the spatial domain weighted gray scale data of each display region is also obtained in the way as described above.

In the step S24, a gray scale compensation coefficient of each display region is determined according to the spatial domain weighted gray scale data.

Here, a rule of a temperature difference between the display regions is that, the larger the gray scale is, the higher the temperature is, and thus, the smaller the gray scale compensation value is. The spatial domain weighted gray scale data represents the influence of other surrounding display regions A on the gray scale of the central display region O, which is mainly reflected in the temperature influence. That is, the larger the value of the spatial domain weighted gray scale data is, the larger the temperature influence is, and the smaller the gray scale compensation coefficient should be. Therefore, in a case, the complement of the spatial domain weighted gray scale data may be used as the gray scale compensation coefficient $S_O$ of the display region O. Here, the complement of the spatial domain weighted gray scale data $Y_{O\_i}'$ is $1-Y_{O\_i}'$. That is, a difference between 1 and the spatial domain weighted gray scale data is used as the gray scale compensation coefficient $S_O$ of the display region. In another case, an inverse of the spatial domain weighted gray scale data may also be used as the gray scale compensation coefficient $S_O$ of the display region.

Similarly, the gray scale compensation coefficient of any other display region may be determined through the steps S21 to S24, and the repeated description is omitted.

Then, the gray scale compensation coefficient $S_O$ of each display region is used as the gray scale compensation coefficient S of the pixel in the corresponding display region O. Specifically, the gray scale compensation coefficient $S_O$ of each display region is used as the gray scale compensation coefficient S of each of $$\left(\frac{w}{k}\right)\times\left(\frac{h}{k}\right)$$

pixels in the corresponding display region.

Then, after the gray scale compensation coefficient corresponding to each display region is obtained, target gray scale compensation data may be further determined by using the gray scale compensation coefficient corresponding to each display region and the initial gray scale compensation data, specifically by referring to step S3.

In the step S3, the target gray scale compensation data is determined according to the gray scale compensation coefficient and the initial gray scale compensation data.

In the step S3, the target gray scale compensation data is determined according to the initial gray scale compensation data $G_i^{max}$ determined in the step S1 and the gray scale compensation coefficient S determined in the step S2. Specifically, the gray scale compensation coefficient $S_{(x,y)}$ of the pixel is multiplied by the initial gray scale compensation data $C_i^{max}$ of the corresponding pixel to obtain the target gray scale compensation data $Z_{(x,y)}$ of the corresponding pixel, specifically by referring to following formula 5.

$$Z_{(x,y)} = G_i^{max} \times S_{(x,y)} \quad \text{Formula 5}$$

The target gray scale compensation data $Z_{(x,y)}$ of each of the remaining pixels (x, y) may be determined by referring to the formula 5, and repeated description is omitted.

In the step S4, a gray scale compensation is performed on the current frame image data according to the target gray scale compensation data to obtain compensated frame image data.

In some examples, in order to improve uniformity and consistency of the gray scale compensation, for sub-pixels of the pixel in the current frame image data, that is, three channels R, G and B, the target gray scale compensation data, $\mu_1\times Z_{(x,y)}$, $\mu_2\times Z_{(x,y)}$ and $\mu_3\times Z_{(x,y)}$, of each sub-pixel is further determined according to a preset brightness attenuation ratio of the three channels R:G:B=$\mu_1$:$\mu_2$:$\mu_3$. Then, the gray scale compensation is performed on the sub-pixels of the pixel in the current frame image data, to obtain updated values of the three channels R, G and B of the pixel, and the updated values of the three channels serve as the compensated frame image data, wherein the value of the red channel is $r'=r-\mu_1\times Z_{(x,y)}$, the value of the green channel is $g'=g-\mu_2\times Z_{(x,y)}$ and the value of the blue channel is $b'=b-\mu_3\times Z_{(x,y)}$. The pixel in the current frame image data is compensated in the way as described above to obtain the compensated frame image data.

In some examples, the R channel is a channel that is most susceptible to a temperature change due to its own characteristics, and thus the amount of attenuation of the gray scale is greatest in the R channel. In order to improve the data processing efficiency, the target gray scale compensation data $Z_{(x,y)}$ is subtracted from the channel value r of the R channel of the pixel in the current frame image data to obtain updated data of the R channel of the pixel, so as to obtain updated values of the three channels R, G and B (wherein, values of the channel G and the channel B are unchanged) of the pixel. The updated values of the three channels serve as the compensated frame image data. The pixel in the current frame image data is compensated in the way as described above to obtain the compensated frame image data.

In some examples, splicing gaps exist between the display panels spliced with each other in the spliced display screen, and thus when the gray scale compensation is performed on the current frame image data, in order to further optimize the gray scale compensation at positions where the display panels are spliced, a filtering processing is to be performed on the target gray scale compensation data. Specifically, for Q×Q display regions (0<Q≤m), an average value of the target gray scale compensation data $Z_{(x,y)}$ of pixels in the Q×Q display regions is calculated, and the average value is used as filtered gray scale compensation data $Z_{(x,y)}'$ of the first display region in the Q×Q display regions. Then, the gray scale compensation is performed on the current frame image data according to the filtered gray scale compensation data $Z_{(x,y)}'$ to obtain the compensated frame image data. For a specific compensation process, reference may be made to the specific compensation step in the step S4, and repeated details are not described here.

After the compensated frame image data is obtained, the current frame image data may be used as the sampled frame in the next sliding window to update the historical frame image data.

Figure 4:
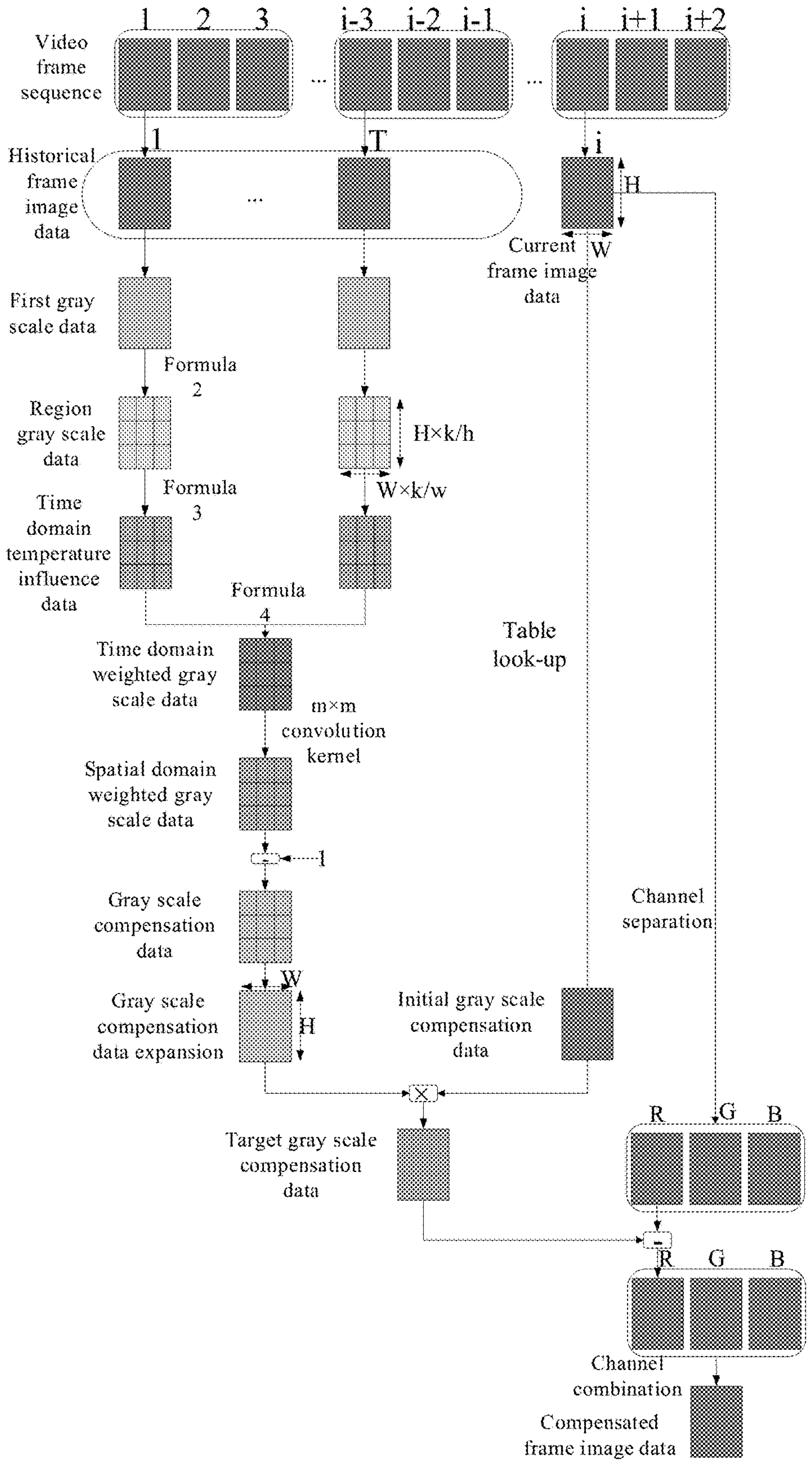
FIG. 4 is a schematic diagram of a gray scale compensation process according to an embodiment of the present disclosure.

For example, FIG. 4 is a schematic diagram of a gray scale compensation process according to an embodiment of the present disclosure. As shown in FIG. 4, the specific gray scale compensation step/process includes following steps S41 to S413.

In the step S41, the video frame sequence is input, the frame image data in the video frame sequence is sampled according to the preset sequence order, and the frame of frame image data obtained by sampling the frame image data at a current moment is considered as the current frame image data.

In the step S42, for the pixel in the current frame image data, an average gray scale of the sub-pixels is obtained as first gray scale data $G_j$ according to the ratio of R:G:B=reteR:reteG:reteB of heating capacities of the sub-pixels of the pixel.

In the step S43, the display panel is partitioned, and the region gray scale data $G_O^{mean}$ is calculated to be obtained according to the formula 2.

In the step S44, the region gray scale data $G_O^{mean}$ is substituted into the formula 3 to calculate to obtain the time domain temperature influence data $Y_O$.

In the step S45, the time domain weighted coefficient $W_v$ of each of T frames of historical frame image data corresponding to the sliding window and the time domain temperature influence data $Y_O$ are substituted into the formula 4 to calculate to obtain the time domain weighted gray scale data $Y_{O\_i}$.

In the step S46, the time domain weighted gray scale data $Y_{O\_i}$ of each display region is filtered by using m×m coefficients in the convolution kernel to obtain the spatial domain weighted gray scale data $Y_{O\_i}'$ of each display region O.

In the step S47, a difference between 1 and the spatial domain weighted gray scale data $Y_{O\_i}'$ is used as the gray scale compensation data of the display region O.

In the step S48, the gray scale compensation coefficient $S_O$ of each display region is used as the gray scale compensation coefficient $S_{(x,y)}$ of each of $$\left(\frac{w}{k}\right)\times\left(\frac{h}{k}\right)$$

pixels in the corresponding display region.

In the step S49, the gray scale compensation data table is searched according to the first gray scale data $G_j$ to obtain the initial gray scale compensation data $G_i^{max}$.

In the step S410, the initial gray scale compensation data $G_i^{max}$ corresponding to the pixel is multiplied by the gray scale compensation coefficient $S_{(x,y)}$ of the pixel to obtain the target gray scale compensation data $Z_{(x,y)}=S_{(x,y)}\times G_i^{max}$ of the pixel.

In the step S411, the target gray scale compensation data $Z_{(x,y)}$ is filtered to obtain the filtered gray scale compensation data $Z_{(x,y)}'$.

In the step S412, three channels of the pixel are separated from each other; and the filtered gray scale compensation data is subtracted from the channel value r of the R channel, and the three channels are merged together to obtain the compensated frame image data.

In the step S413, the current frame image data is used as the sampled frame in the next sliding window.

For the detailed description of each of the steps S41 to S413, reference may be made to the detailed description of the specific implementation in the steps S1 to S4, and the repeated description is not repeated here.

For the parameters pre-configured for the spliced display screen in the above embodiment, the embodiment of the present disclosure further provides a parameter determination method for the spliced display screen, where a preset parameter determination system is used as an execution main body of the parameter determination method for the spliced display screen, and includes a customized reference spliced display screen, a spliced display screen waiting for a gray scale compensation, and a testing device. The reference spliced display screen is used as a reference screen of the spliced display screen waiting for the gray scale compensation in the above embodiment, and at least one of following parameters configured for the spliced display screen is determined by using the reference spliced display screen: a ratio of heating capacities of sub-pixels in the pixel; a gray scale compensation data table; a first non-linear factor; a time domain weighted coefficient; or a convolution kernel.

In the embodiment of the present disclosure, the reference spliced display screen is used as a reference screen of spliced display screens with different resolutions, different gamma characteristics and different maximum peak brightness, to determine the parameters to be configured for the different spliced display screens in advance. Based on above, for different spliced display screens, the process of determining the parameters is not to be repeatedly performed with each spliced display screen itself as a reference. It is only to determine the parameters with the reference spliced display screen as a reference and then configure the parameters respectively for the corresponding spliced display screens. In this way, the efficiency of the whole processing flow in the development and deployment stage for the technical personnel can be improved.

The specific process of determining each parameter is described in detail below.

In some implementations, determining the ratio of heating capacities of the sub-pixels in the pixel is specifically referred to steps S11 to S12.

In the step S11, the reference spliced display screen is lit according to sub-colors of the sub-pixels, respectively, to obtain a temperature change of the reference spliced display screen for each sub-color.

In the step S12, the temperature change of the reference spliced display screen for each sub-color is normalized to obtain the ratio of heating capacities of the sub-pixels.

The sub-colors of the sub-pixels include red color, green color, and blue color.

Figure 5:
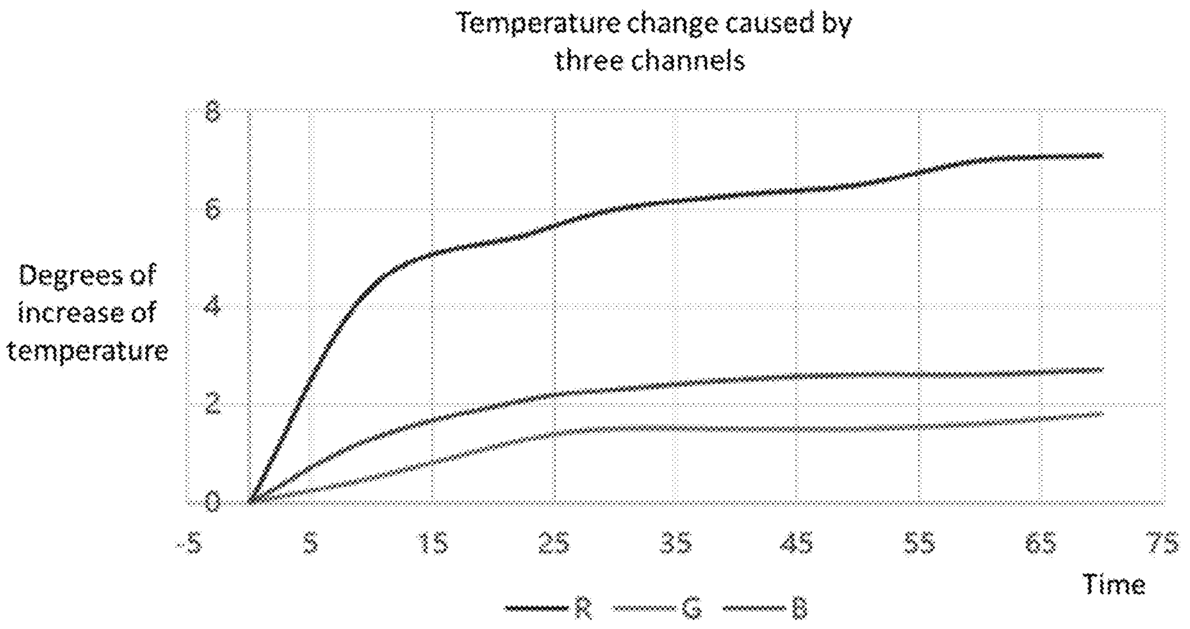
FIG. 5 is a graph of a temperature change caused by three channels according to an embodiment of the present disclosure.

FIG. 5 is a graph of a temperature change caused by three channels according to an embodiment of the present disclosure. As shown in FIG. 5, FIG. 5 shows a change curve of a measured temperature of the reference spliced display screen along with time in cases where the reference spliced display screen is lit according to three pure colors, including red color, green color and blue color, respectively. A heating effect is most obvious for a red lamp, and after the temperature change curve tends to be stable, the measured temperature is increased by 6° C. (celsius); a heating effect for a blue lamp is weaker than that for the red lamp, and after the temperature change curve tends to be stable, the measured temperature is increased by 2.7° C.; a heating effect for a green lamp is weakest, and after the temperature change curve tends to be stable, the measured temperature is increased by 2° C., finally obtaining a gray scale ratio of R:G:B=6.4:2:2.7. The normalization processing is performed on the gray scale ratio to ensure reteR+reteG+reteB=1, and then R:G:B=reteR:reteG:reteB=0.576577:0.18018:0.243243 is obtained.

In some examples, the brightness and the temperature are linearly changed at different gray scales, specifically, the brightness is decreased as the temperature increases, and thus the brightness corresponding to each gray scale at different temperatures may be determined by controlling a temperature change range of the reference spliced display screen, and then the compensation gray scale data for maintaining the fixed brightness of each gray scale at different temperatures can be obtained.

Figure 6A:
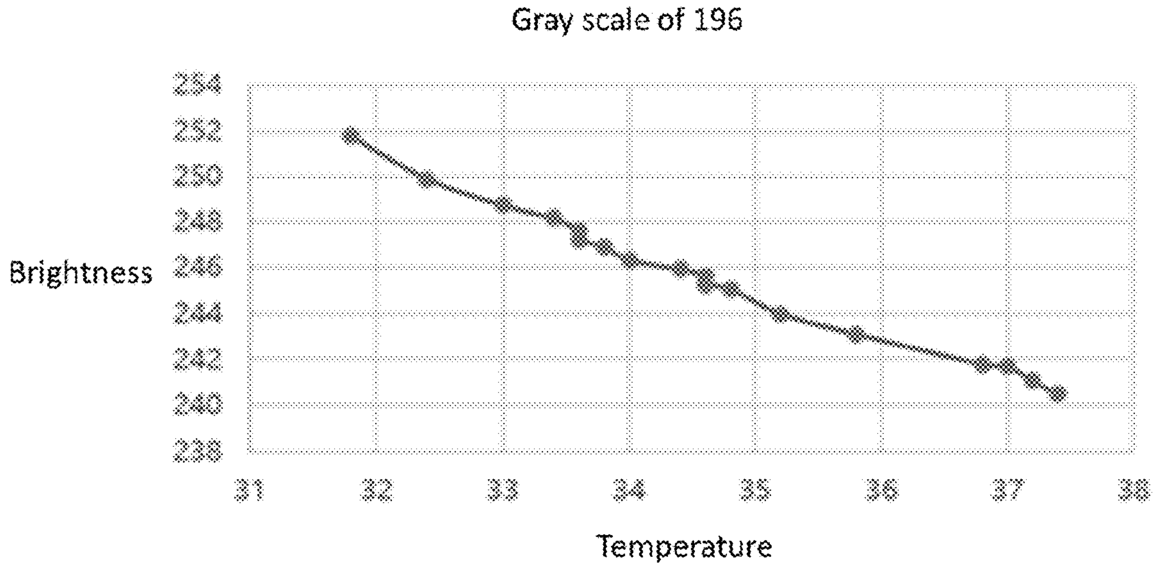
FIG. 6*a* and FIG. 6*b* are schematic diagrams of a curve of brightness versus temperature according to an embodiment of the present disclosure.
Figure 6B:
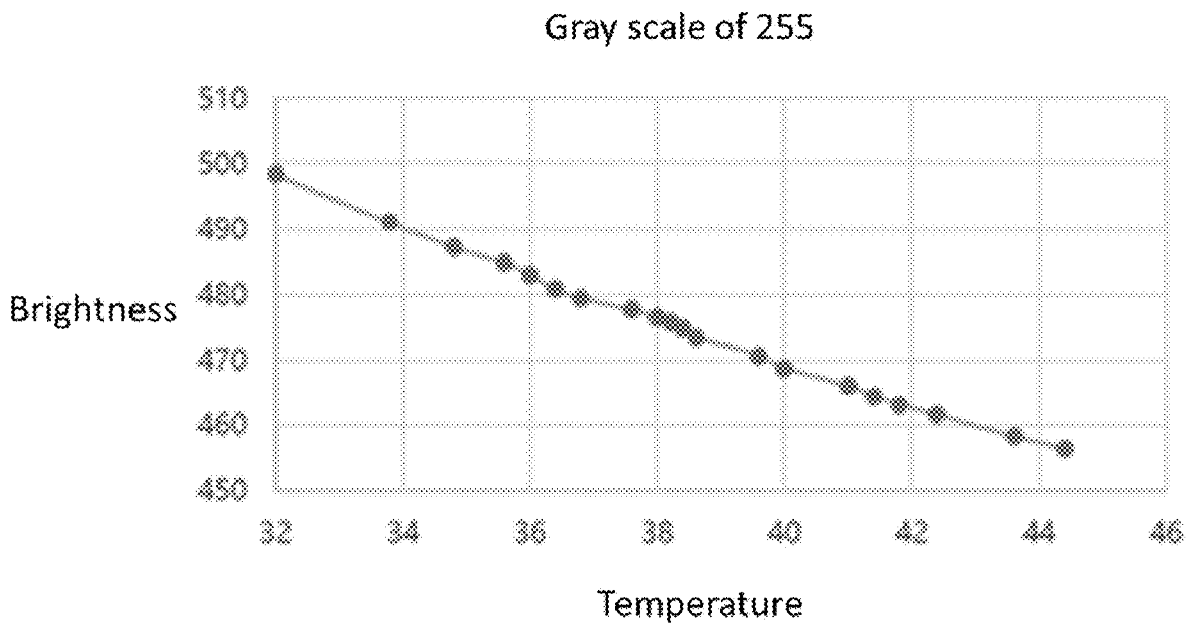

FIG. 6*a* and FIG. 6*b* are schematic diagrams of a curve of brightness versus temperature according to an embodiment of the present disclosure, respectively. As shown in FIGS. 6*a* and 6*b*, respectively, FIG. 6*a* shows a change curve of the brightness decreasing with the temperature increasing at a gray scale of 196; FIG. 6*b* shows a change curve of the brightness decreasing with the temperature increasing at a gray scale of 255.

The specific steps S101 to S106 for determining the gray scale compensation data table are as follows, wherein the steps S101 to S103 are used for determining the compensation gray scale data $G_{max}$ of each gray scale in a preset gray scale range; the steps S104 to S106 are used for determining the temperature adjustment parameter α.

In the step S101, the reference spliced display screen is lit according to the first gray scale, and a first average temperature of the reference spliced display screen is determined; and the gray scales in the preset gray scale range are traversed at the first average temperature, to determine first brightness information at each gray scale.

Figure 7:
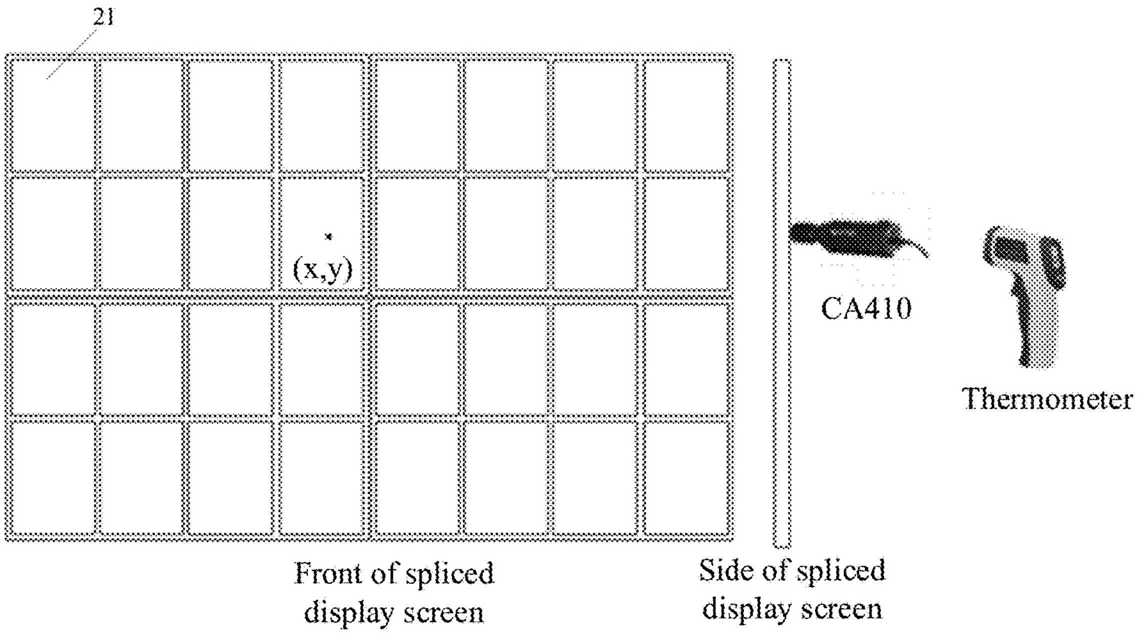
FIG. 7 is a schematic diagram of a temperature measurement process of a reference spliced display screen according to an embodiment of the present disclosure.

FIG. 7 is a schematic diagram of a temperature measurement process of a reference spliced display screen according to an embodiment of the present disclosure. As shown in FIG. 7, the first gray scale is a gray scale of 0, the reference spliced display screen is lit fully according to the gray scale of 0, that is, to display a white screen. After the temperature of the reference spliced display screen is stabilized, the temperature of the pixel in the reference spliced display screen is recorded by a temperature measuring instrument, and an average temperature of the full screen is calculated as the first average temperature $T_0$. Then, the reference spliced display screen is kept at the first average temperature $T_0$ constantly, the gray scales in the preset gray scale range from 0 to 255 are traversed sequentially. That is, the reference spliced display screen is lightened sequentially according to the gray scales, the brightness of a central point of the reference spliced display screen is measured by an optical instrument, such as a color analyzer CA410, and the brightness $lv_f^{To}$ of each gray scale f is recorded.

In the step S102, the reference spliced display screen is lit according to a second gray scale, and a second average temperature of the reference spliced display screen is determined; and the gray scales in the preset gray scale range are traversed at the second average temperature, to determine second brightness information at each gray scale.

As shown in FIG. 7, the second gray scale is a gray scale of 255, the reference spliced display screen is lit fully according to the gray scale of 255, to display a black screen. After the temperature of the reference spliced display screen is stabilized, the temperature of the pixel in the reference spliced display screen is recorded by the temperature measuring instrument, and an average temperature of the full screen is calculated as the second average temperature $T_{max}$. Then, the reference spliced display screen is kept at the second average temperature $T_{max}$ constantly, the gray scales in the preset gray scale range from 0 to 255 are traversed sequentially. That is, the reference spliced display screen is lightened sequentially according to the gray scales, the brightness of the central point of the reference spliced display screen is measured by the color analyzer CA410, and the brightness $lv_f^{T_{max}}$ of each gray scale f is recorded.

In the step S103, after the first brightness information and the second brightness information meet a first preset condition, a first target gray scale corresponding to the first brightness information and a second target gray scale corresponding to the second brightness information are determined, and a difference between the first target gray scale and the second target gray scale is used as compensation gray scale data of the second target gray scale.

The first preset condition is $lv_{f1}^{T_{max}} \approx lv_{f2}^{To}$.

The gray scales in the range from 0 to 255 are traversed, and the first target gray scale f1 and the second target gray scale f2 are determined after the first preset condition $lv_{f1}^{T_{max}} \approx lv_{f2}^{To}$ is met. The second target gray scale f2 is a compensation gray scale of the first target gray scale f1, and the compensation gray scale data of the first target gray scale f1 is $G_{max}$=f1−f2, and since the brightness is reduced as the temperature increases, if $lv_{f1}^{T_{max}} \approx lv_{f2}^{To}$, f1>f2.

The gray scale compensation data table includes compensation gray scales of the gray scales within the preset gray scale range, as shown in table 1. In the table 1, the compensation gray scale data $G_{max}$ of the gray scale of 0 is 0, the compensation gray scale data $G_{max}$ of the gray scale of 1 is 0, the compensation gray scale data $G_{max}$ of the gray scale of 128 is x, the compensation gray scale data $G_{max}$ of the gray scale of 254 is y, and the compensation gray scale data $G_{max}$ of the gray scale of 255 is z.

In the step S104, a lowest temperature of the spliced display screen is determined during the spliced display screen being lit according to the first gray scale.

Specifically, the spliced display screen is lit fully according to the gray scale of 0, i.e., to display the white screen. After the temperature of the spliced display screen is stable, the lowest temperature $T_O'$ of the central point of the spliced display screen is recorded by using the temperature measuring instrument.

In the step S105, a highest temperature of the spliced display screen is determined during the spliced display screen being lit according to the second gray scale.

Specifically, the spliced display screen is lit fully according to the gray scale of 255, i.e., to display the black screen. After the temperature of the spliced display screen is stable, the highest temperature $T_{max}'$ of the central point of the spliced display screen is recorded by using the temperature measuring instrument.

In the step S106, a temperature adjustment parameter is determined according to the lowest temperature, the highest temperature, the first average temperature and the second average temperature.

Specifically, a ratio of a first difference between the highest temperature and the lowest temperature to a second difference between the second average temperature and the first average temperature may be used as the temperature adjustment parameter.

Here, the first difference is ($T_{max}'-T_0'$), the second difference is ($T_{max}-T_0$), and the temperature adjustment parameter α is $$\frac{T'_{max} - T'_0}{T_{max} - T_0}.$$

Alternatively, the temperature adjustment parameter may be determined by performing other arithmetic operations on the lowest temperature, the highest temperature, the first average temperature, and the second average temperature. For example, a ratio of a product of the first difference and a corresponding weight to a product of the second difference and a corresponding weight is used as the temperature adjustment parameter. The weight of the first difference and the weight of the second difference may be set according to actual application conditions.

For the steps S104 to S106, considering the resolutions, the gamma characteristics and the changes of the maximum peak value brightness corresponding to different spliced display screens, the temperature adjustment parameter of the gray scale compensation data corresponding to the spliced display screen is further determined according to the spliced display screen with an actual gray scale to be compensated by using the reference spliced display screen as a reference. Here, only the spliced display screen being actually applied is to be simply measured, that is, the spliced display screen is lit according to the first gray scale to measure the lowest temperature $T_0'$ of the spliced display screen, and the spliced display screen is lit according to the second gray scale to measure the highest temperature $T_{max}'$ of the spliced display screen, by combining with the first average temperature and the second average temperature generated in advance by using the reference spliced display screen, the temperature adjustment parameter α of the spliced display screen is obtained. The process of determining the compensation gray scale data $G_{max}$ (i.e., including the steps S101 to S103) is not to be repeatedly performed for different spliced display screens. The compensation gray scale data $G_{max}$, the first average temperature $T_0$ and the second average temperature $T_{max}$ determined for the reference spliced display screen can be directly used in the process of determining the temperature adjustment parameter for any spliced display screen, so that the parameters can be rapidly deployed in different spliced display screens, and the efficiency of the overall processing flow in the development and deployment stage for the technical personnel is improved.

Table 1 shows the gray scale compensation data table including the specific parameters as follows.

TABLE 1

| Gray scale f | Compensation gray scale data $G_{max}$ | Temperature adjustment parameter α |
|---|---|---|
| 0 | 0 | $\alpha = \frac{T'_{max} - T'_0}{T_{max} - T_0}$ |
| 1 | 0 | α |
| . . . | . . . | . . . |
| 128 | x | α |
| . . . | . . . | . . . |
| 254 | y | α |
| 255 | z | α |

In some implementations, the first non-linear factor is determined by following steps S22-1 to 22-2.

In the step S22-1, a first region of the reference spliced display screen is lit according to the first gray scale and a second region of the reference spliced display screen is lit according to the second gray scale.

Figure 8:
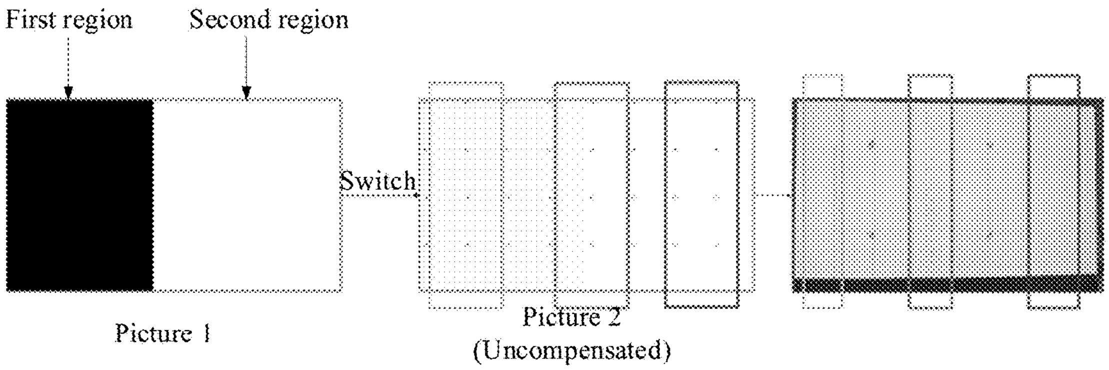
FIG. 8 is a schematic diagram of a reference spliced display screen in a process of measuring a first non-linear factor according to an embodiment of the present disclosure.

Here, the first region and the second region are different from each other. FIG. 8 is a schematic diagram of a reference spliced display screen in a process of measuring a first non-linear factor according to an embodiment of the present disclosure. As shown in FIG. 8, for example, the first region of the reference spliced display screen is lit according to the first gray scale (i.e., the gray scale of 0), so as to display the black screen. Simultaneously, the second region of the reference spliced display screen is lit according to the second gray scale (i.e., the gray scale of 255), so as to display the white screen. The reference spliced display screen displays both the white screen and the black screen, so that a contrast of the reference spliced display screen reaches the maximum.

In the step S22-2, after a preset time duration, the first region and the second region are lit according to the second gray scale, the first non-linear factor is adjusted, and the adjusted first non-linear factor is determined after a display picture of the first region is consistent with a display picture of the second region.

Continuing to refer to FIG. 8, the reference spliced display screen is adjusted from a picture 1 to a picture 2. In this case, the first region is lit according to the second gray scale to display the white screen. For the purpose of making an actual display effect of the picture 2 to be uniform, the power exponent b in the formula 3 is adjusted, the step of determining the time domain temperature influence data $Y_O$ to determine the target gray scale compensation data $Z_{(x,y)}$ is continuously to be performed by using the adjusted power exponent b, and finally, whether display pictures of the first region and the second region in the compensated frame image data are consistent is to be determined. If the display pictures are substantially consistent or uniform, the finally adjusted power exponent b is to be determined as the adjusted first non-linear factor.

For example, for adjusting the first non-linear factor b, the power exponent b in the formula 3 may be sequentially adjusted from a floating point number of 1 upward by a step size of 0.1, that is, b is sequentially set to 1.1, 1.2, 1.3, . . . , and 2, to determine whether the display pictures of the first region and the second region in the compensated frame image data are consistent; or the power exponent b in the formula 3 may be sequentially adjusted from a floating point number of 1 downward by a step size of 0.1, that is, b is sequentially set to 0.9, 0.8, 0.7, . . . and 0, to determine whether the display pictures of the first region and the second region in the compensated frame image data are consistent.

In some implementations, the time domain weighted coefficient is determined by a step S220.

In the step S220, the time domain weighted coefficient is determined according to time sequence information of a preset quantity of frames of historical frame image data and a preset second non-linear factor.

Here, the preset quantity is T frames, and the time sequence information of the history frame image data includes a sampling timing of the $v^{th}$ frame, v=[1,2,3, . . . , T]. The time domain weighted coefficient to be adjusted corresponding to the first frame of historical frame image data is $w_1'$, the time domain weighted coefficient to be adjusted corresponding to the second frame of historical frame image data is $w_2'$, . . . , and the time domain weighted coefficient to be adjusted corresponding to the $T^{th}$ frame of historical frame image data is $w_T'$, wherein $\Sigma_{v=1}^{T}=w_v'=1$. The second non-linear factor a is adjusted, and the time domain weighted coefficient to be adjusted corresponding to each frame of historical frame image data is determined according to following formula 6.

$$w_v' = \frac{v^a}{\sum_{v=1}^{T} v^a} \quad \text{Formula 6}$$

Figure 9:
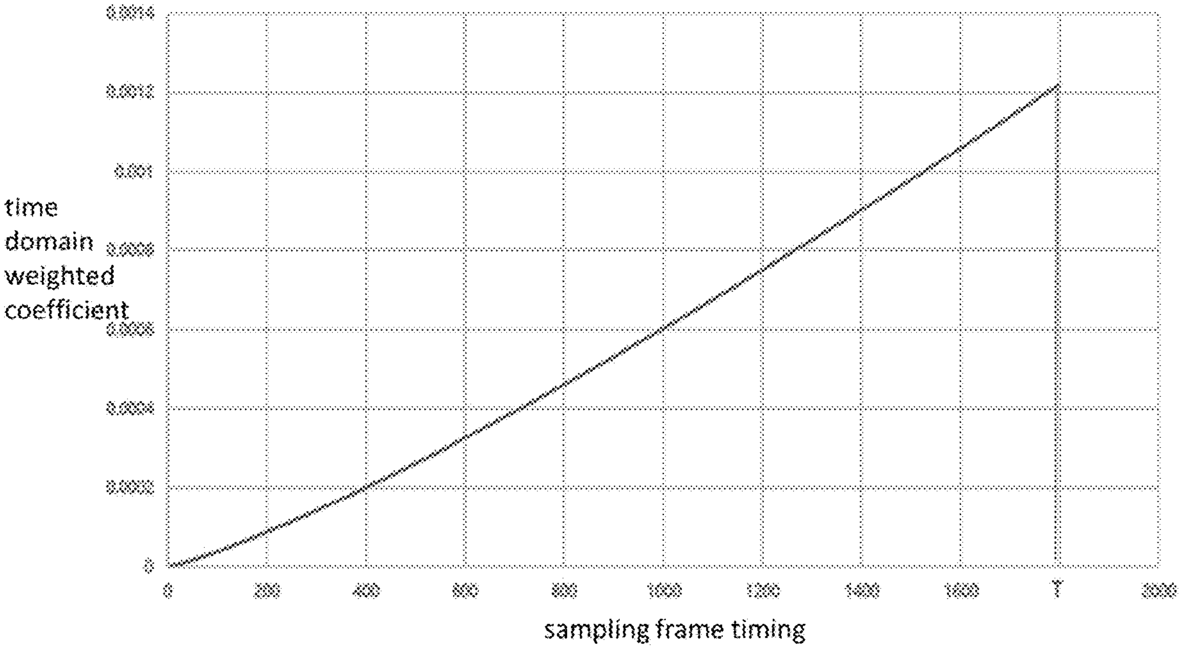
FIG. 9 is a schematic diagram illustrating a non-linear relationship between a time domain weighted coefficient and a sampling frame timing after determining a second non-linear factor according to an embodiment of the present disclosure.

As shown in FIG. 8, the first region of the reference spliced display screen is lit according to the first gray scale (i.e., the gray scale of 0), so as to display the black screen. Simultaneously, the second region of the reference spliced display screen is lit according to the second gray scale (i.e., the gray scale of 255), so as to display the white screen. The reference spliced display screen displays both the white screen and the black screen, so that a contrast of the reference spliced display screen reaches the maximum. The reference spliced display screen is adjusted from a picture 1 to a picture 2. In this case, the first region is lit according to the second gray scale to display the white screen. For the purpose of making an actual display effect of the picture 2 to be uniform, the power exponent a in the formula 6 is adjusted on the premise of $\Sigma_{v=1}^{T}w_v'=1$, the step of determining the time domain weighted coefficient to be adjusted to determine the target gray scale compensation data $Z_{(x,y)}$ is continuously to be performed by using the adjusted power exponent a, and finally, whether the display pictures of the first region and the second region in the compensated frame image data are consistent is to be determined. If the display pictures are substantially consistent or uniform, the finally adjusted power exponent a is determined to be the second non-linear factor. The time domain weighted coefficient $w_v'$, to be adjusted, obtained according to the formula 6 by using the second non-linear factor is the finally adjusted time domain weighted coefficient $W_v$, as shown in FIG. 9. FIG. 9 is a schematic diagram illustrating a non-linear relationship between a time domain weighted coefficient and a sampling frame timing after determining a second non-linear factor.

In some implementations, the convolution kernel is determined, specifically by referring to following steps S231 to S234.

In the step S231, initial temperatures of the P×P display panels in the reference spliced display screen are acquired before the P×P display panels are lit, and recorded as $T_1$, P is a positive integer.

In the step S232, a region division is performed on at least one display panel, and the target display panel at the center of the P×P display panels is lit according to the second gray scale to obtain a third average temperature of each display region.

The second gray scale is the gray scale of 255. In an example that P=3 and there are 3×3 display panels, the fifth display panel is at the center of the 3×3 display panel, that is, the fifth display panel is the target display panel. At least one display panel includes k×k display regions, and k may be equal to 3 or 5. A temperature of the pixel is recorded, and the third average temperature $\overline{T_3}$ of each of 3k×3k display regions is calculated according to the temperature of the pixel.

In the step S233, a difference between the third average temperature and the initial temperature is used as the temperature change of the display region.

The temperature change is $\Delta T=|\overline{T_3}-T_1|$, and the temperature change ΔT of each of the 3k×3k display regions can be obtained, and the maximum temperature change $\Delta T_{max}$ is determined.

In the step S234, a ratio of the temperature change of each display region to the maximum temperature change of the display regions is normalized to obtain the convolution kernel.

The ratio m of the temperature change ΔT of each display region to the maximum temperature change $\Delta T_{max}$ of the display regions is determined to obtain a dimensionless parameter $m_o=\Delta T_o/\Delta T_{max}$, wherein o indicates the $o^{th}$ display region.

The normalization processing is performed on $m_o$ corresponding to each display region, so that $\Sigma_{o=1}^{(k\times P)\times(k\times P)}m_o=1$, to obtain the coefficients $m_1, m_2, \ldots, m_M$ in the convolution kernel. The number M×M of the coefficients in the convolution kernel is the same as the number (k×P)×(k×P) of the display regions of the reference spliced display screen. For example, if P=3 and k=3, M=9. That is, for 3×3 display panels in the reference spliced display screen, at least one display panel includes 3×3 display regions, and thus the convolution kernel with 9×9 coefficients is correspondingly obtained.

An embodiment of the present disclosure further provides a spliced display screen. The principle of solving the problems by the spliced display screen in the embodiment of the present disclosure is similar to that in the display method for the spliced display screen in the embodiment of the present disclosure, and thus the specific description of the spliced display screen may refer to the specific description of the display method for the spliced display screen, and repeated parts are not described here again.

The spliced display screen provided by the embodiment of the present disclosure includes a gray scale compensation circuit 100, where the gray scale compensation circuit 100 may be integrated in a field-programmable gate array (FPGA) for performing a gray scale compensation on a display screen. The spliced display screen is a spliced display screen applied actually, and the parameters (that is, a ratio of heating capacities of sub-pixels in the pixel, a gray scale compensation data table, a first non-linear factor, a time domain weighted coefficient and a convolution kernel) obtained by using a reference spliced display screen are written into an FPGA chip. In this case, the spliced display screen can realize a real-time gray scale compensation on frame image data in a video frame sequence. The spliced display screen of the embodiment of the present disclosure includes the gray scale compensation circuit 100, where the gray scale compensation circuit 100 can sample the frame image data in the video frame sequence according to a preset sequence order (i.e., a playing order of the video frame sequence), and after each frame of frame image data is sampled, perform a gray scale compensation on the sampled current frame image data, so as to obtain the compensated frame image data.

Figure 10:
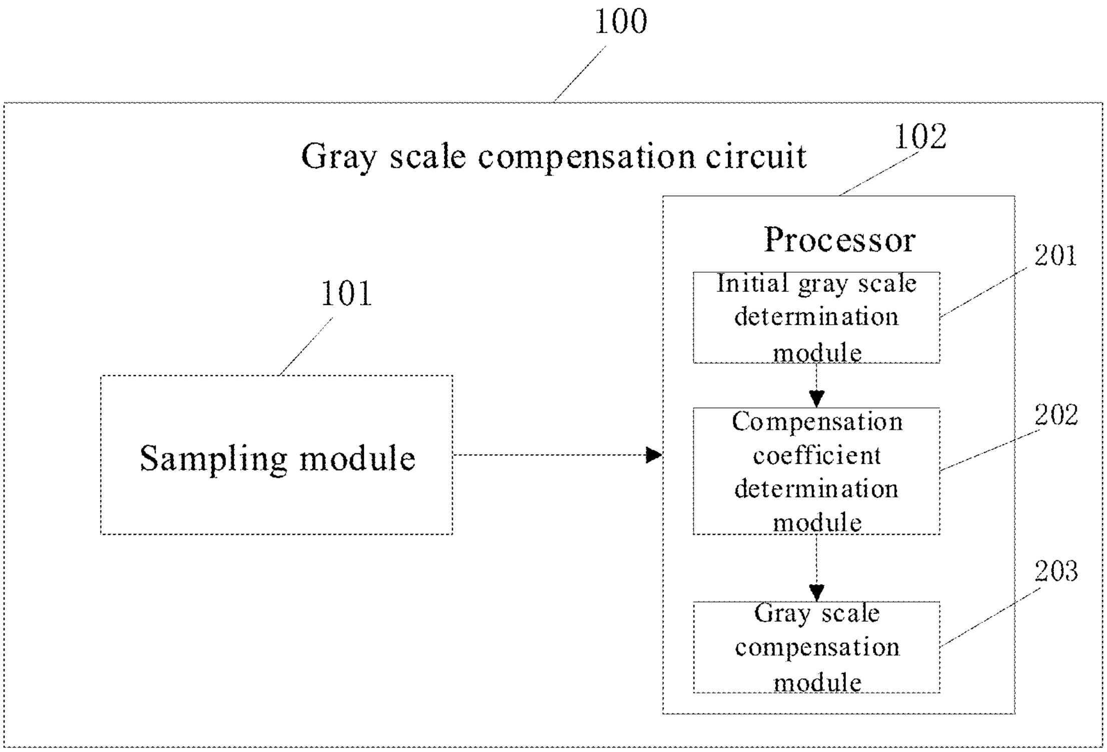
FIG. 10 is a schematic diagram of a gray scale compensation circuit in a spliced display screen according to an embodiment of the present disclosure.

The gray scale compensation on the display data in the spliced display screen will be described below in detail with reference to a specific structure of the gray scale compensation circuit 100 of the spliced display screen. The spliced display screen includes a plurality of display panels spliced with each other; at least one display panel includes a plurality of display regions. FIG. 10 is a schematic diagram of a gray scale compensation circuit in a spliced display screen according to an embodiment of the present disclosure. As shown in FIG. 10, the gray scale compensation circuit 100 includes a sampling module 101 and a processor 102.

The sampling module 101 is configured to sample the frame image data in the video frame sequence according to the preset sequence order, so as to obtain current frame image data. The processor 102 is configured to determine initial gray scale compensation data according to first gray scale data of the pixel in the current frame image data and the gray scale compensation data table pre-generated, wherein the gray scale compensation data table includes compensation gray scale data of gray scales in a preset gray scale range and a pre-configured temperature adjustment parameter of the spliced display screen, and the temperature adjustment parameter configured for the spliced display screen varies with the spliced display screen; determine a gray scale compensation coefficient of each display region; determine target gray scale compensation data according to the gray scale compensation coefficient and the initial gray scale compensation data; and perform the gray scale compensation on the current frame image data according to the target gray scale compensation data to obtain compensated frame image data.

In the spliced display screen provided by the embodiment of the present disclosure, the gray scale compensation coefficient is used to perform the gray scale compensation on the current frame image data of the display region, which can eliminate the visual afterimage of the display region, can improve the uniformity and consistency of a displayed picture, and further improve the visual experience of a user. Moreover, the spliced display screen is configured with various parameters in advance, such as the compensation gray scale data in the gray scale compensation data table, the temperature adjustment parameter and the like, so that the spliced display screen is not to execute the algorithm logic to determine the parameters before being applied, the parameters can be directly obtained to complete the gray scale compensation, the visual afterimage is eliminated, and the efficiency of the gray scale compensation is improved.

In some implementations, the processor 102 includes an initial gray scale determination module 201, a compensation coefficient determination module 202, and a gray scale compensation module 203. The initial gray scale determination module 201 is configured to determine the initial gray scale compensation data according to the first gray scale data of the pixel in the current frame image data and the pre-generated gray scale compensation data table. Here, for the specific execution logic of the initial gray scale determination module 201, reference is made to the specific execution process of the step S1 in the above embodiment, and repeated descriptions are omitted. The compensation coefficient determination module 202 is configured to determine the gray scale compensation coefficient for each display region. Here, for the specific execution logic of the compensation coefficient determination module 202, reference is made to the specific execution processes of the steps S21 to S24 in the above embodiment, and repeated descriptions are omitted. The gray scale compensation module 203 is configured to determine the target gray scale compensation data according to the gray scale compensation coefficient and the initial gray scale compensation data; and perform the gray scale compensation on the current frame image data according to the target gray scale compensation data to obtain the compensated frame image data. Here, for the specific execution logic of the gray scale compensation module 203, reference is made to the specific execution processes of the steps S3 and S4 in the above embodiment, and repeated descriptions are omitted.

In some implementations, the initial gray scale determination module 201 includes a first gray scale determination unit and an initial gray scale determination unit. For determining the first gray scale data of the pixel, the first gray scale determination unit is configured to process the sub-pixels of the pixel in the current frame image data according to a pre-stored ratio of heating capacities of the sub-pixels, to determine the first gray scale data. For determining the initial gray scale compensation data of the pixel, the initial gray scale determination unit is configured to search for the compensation gray scale data corresponding to the first gray scale data from the gray scale compensation data table according to the first gray scale data, and adjust the compensation gray scale data by using the temperature adjustment parameter, to determine the initial gray scale compensation data. Here, for the specific execution logic of the first gray scale determination unit and the initial gray scale determination unit, reference is made to the specific execution process of the step S1 in the above embodiment, and repeated descriptions are omitted.

In some implementations, the compensation coefficient determination module 202 includes a region division unit, a time domain statistical unit, a spatial domain statistical unit, and a compensation coefficient determination unit. For determining the gray scale compensation coefficient of each display region, the region division unit is configured to perform a region division on at least one display panel according to preset resolution information of the display panel to obtain display regions. Here, for the specific execution logic of the region division unit, reference is made to the specific execution process of the step S21 in the above embodiment, and repeated descriptions are omitted.

The time domain statistical unit is configured to determine time domain weighted gray scale data of each display region according to the first gray scale data of each display region and a pre-configured time domain weighted coefficient corresponding to at least one frame of historical frame image data. The time domain weighted gray scale data represents an influence of the at least one frame of historical frame image data of the display region on a gray scale of the current frame image data. Here, for the specific execution logic of the time domain statistical unit, reference is made to the specific execution process of the step S22 in the above embodiment, and repeated details are not repeated.

The spatial domain statistical unit is configured to determine spatial domain weighted gray scale data of each display region according to a preset convolution kernel and the time domain weighted gray scale data. The convolution kernel includes a coefficient representing a thermal diffusion of each display region within a preset region into a surrounding region. The spatial domain weighted gray scale data represents an influence of other surrounding display regions on a gray scale of the display region with the display region serving as a center. Here, for the specific execution logic of the spatial domain statistical unit, reference is made to the specific execution process of the step S23 in the above embodiment, and repeated details are not repeated.

The compensation coefficient determination unit is configured to determine the gray scale compensation coefficient of the display region according to the spatial domain weighted gray scale data. Here, for the specific execution logic of the compensation coefficient determination unit, reference is made to the specific execution process of the step S24 in the above embodiment, and repeated descriptions are omitted.

In some implementations, the time domain statistical unit includes a region gray scale determination sub-unit, a non-linear processing sub-unit, and a time domain weighted sub-unit. The region gray scale determination sub-unit is configured to determine region gray scale data of each display region according to the first gray scale data of the pixel and each display region. Here, for the specific execution logic of the region gray scale determination sub-unit, reference is made to the processing procedure of the above formula 2, and repeated descriptions are omitted.

The non-linear processing sub-unit is configured to determine time domain temperature influence data according to the region gray scale data and a pre-configured first non-linear factor. Here, for the specific execution logic of the non-linear processing sub-unit, reference is made to the processing procedure of the above formula 3, and repeated descriptions are omitted.

The time domain weighted sub-unit is configured to weight the time domain temperature influence data corresponding to each frame of historical frame image data by using the time domain weighted coefficient corresponding to each frame of historical frame image data to obtain the time domain weighted gray scale data of the display region. Here, for the specific execution logic of the time domain weighted sub-unit, reference is made to the processing procedure of the above formula 4, and repeated descriptions are omitted.

In some implementations, the spatial domain statistical unit is specifically configured to weight the time domain weighted gray scale data of each display region in the preset region according to the convolution kernel, and determine the spatial domain weighted gray scale data of the display region. Here, for the specific execution logic of the spatial domain statistical unit, reference is made to the specific execution process of the step S3 in the above embodiment, and repeated descriptions are omitted.

In some implementations, the compensation coefficient determination unit is specifically configured to take a difference between 1 and the spatial domain weighted gray scale data as the gray scale compensation coefficient of the display region. Here, for the specific execution logic of the compensation coefficient determination unit, reference is made to the specific execution process of the step S24 in the above embodiment, and repeated descriptions are omitted.

In some implementations, the gray scale compensation module 203 includes a target gray scale determination unit and a gray scale compensation unit. The target gray scale determination unit is configured to take the gray scale compensation coefficient of each display region as the gray scale compensation coefficient of the pixel in the display region; and determine the target gray scale compensation data of the pixel according to the gray scale compensation coefficient and the initial gray scale compensation data of the pixel. Here, for the specific execution logic of the target gray scale determination unit, reference is made to the specific execution process of the step S3 in the above embodiment, and repeated descriptions are omitted.

The gray scale compensation unit is configured to process the first sub-pixel of the pixel by using the target gray scale compensation data to obtain the compensated frame image data. Here, for the specific execution logic of the gray scale compensation unit, reference is made to the specific execution process of the step S4 in the above embodiment, and repeated descriptions are omitted.

Figure 11:
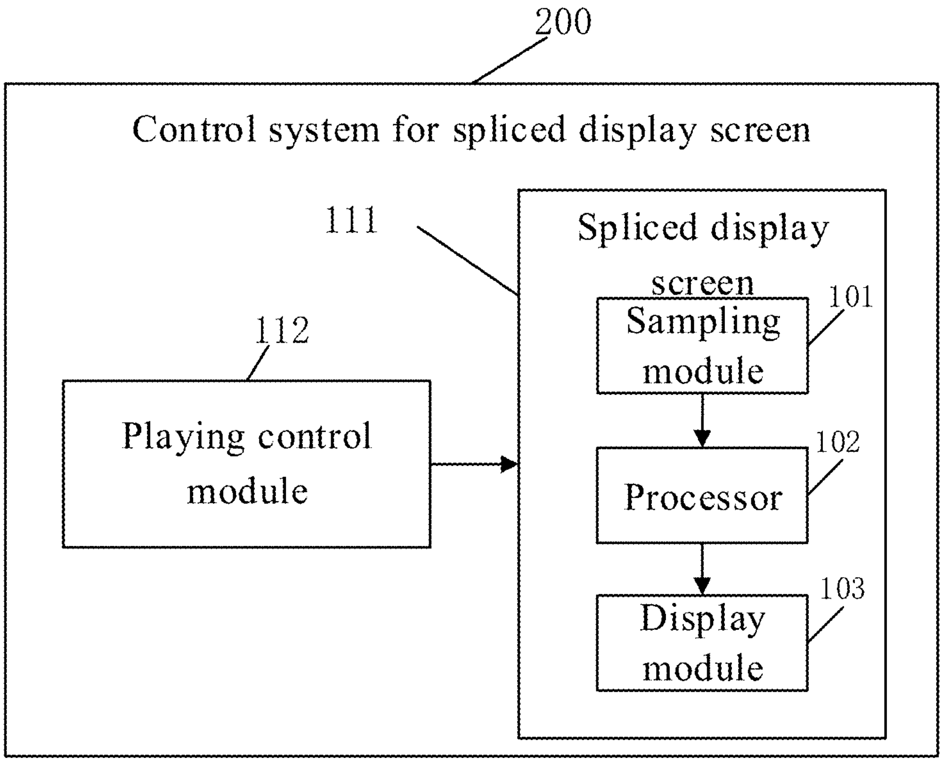
FIG. 11 is a schematic diagram of a control system for a spliced display screen according to an embodiment of the present disclosure.

An embodiment of the present disclosure further provides a control system for a spliced display screen. FIG. 11 is a schematic diagram of a control system for a spliced display screen according to an embodiment of the present disclosure. As shown in FIG. 11, the control system 200 for the spliced display screen includes the spliced display screen 111 in the above embodiment and a playing control module 112. The spliced display screen 111 includes the sampling module 101, the processor 102, and a display module 103. The display module 103 is configured to display the compensated frame image data.

The playing control module 112 is configured to adjust programs in a playing control interface in response to a management operation on the programs in the playing control interface; and obtain edited programs in response to an editing operation on the programs in the playing control interface, and upload the edited programs to the spliced display screen 111.

Here, the management operation on the programs may include at least one of: creating programs or deleting programs. The editing operation may include at least one of: a configuration of a program window, a configuration of a time duration of playing, a configuration of a program type, a configuration of continuously playing a plurality of programs or a configuration of circularly playing a program.

Figure 12:
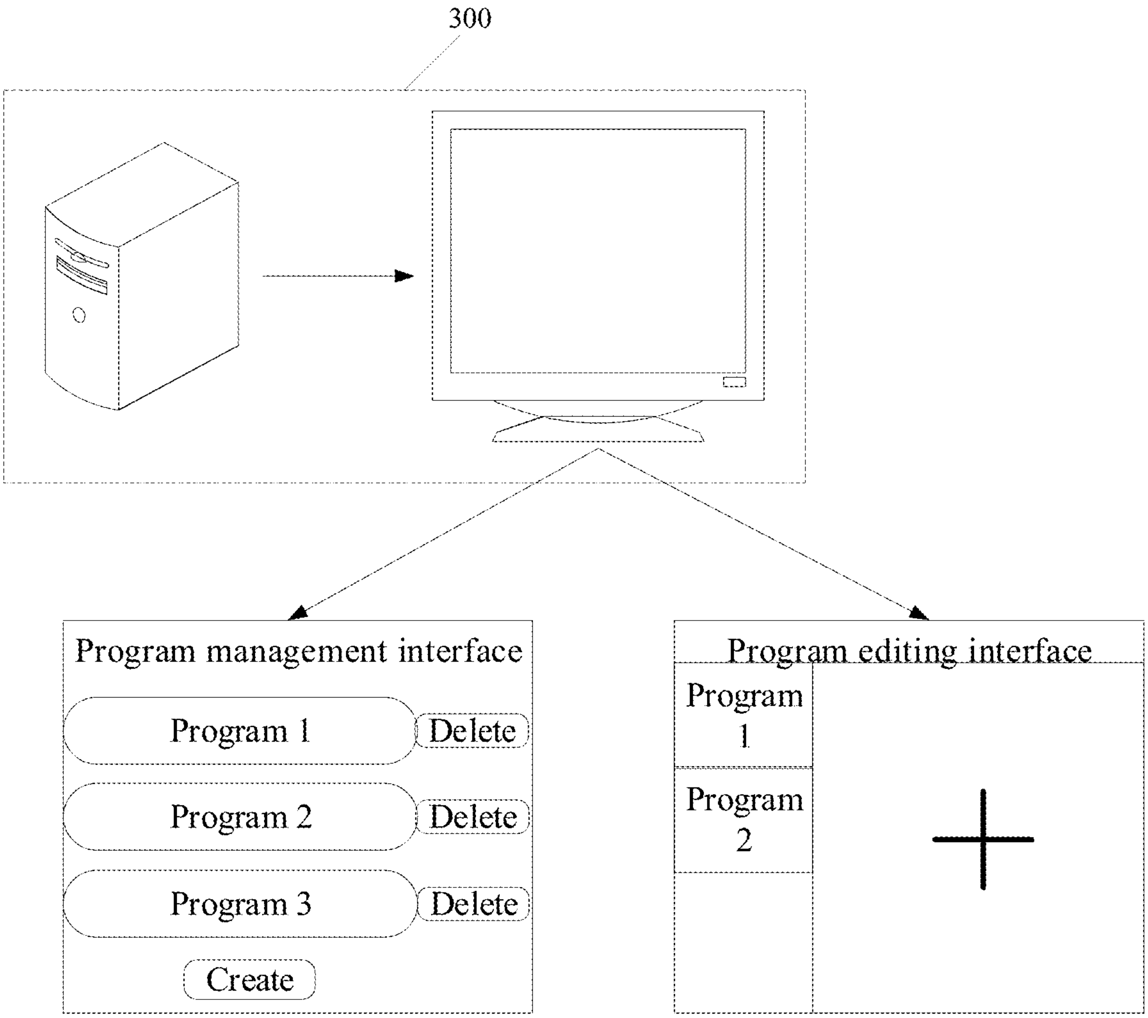
FIG. 12 is a schematic diagram of a prototype of a playing control module according to an embodiment of the present disclosure.

FIG. 12 is a schematic diagram of a prototype of a playing control module according to an embodiment of the present disclosure. As shown in FIG. 12, the playing control module 112 is mounted on a playing control device 300 and is configured to manage playing contents of the spliced display screen by producing a program. Specifically, the playing control module 112 is mounted on the playing control device 300, and is configured to output a signal through a high definition multimedia interface (HDMI). The playing control module 112 mainly includes a program management interface and a program editing interface in an interface of a terminal display screen. The program management interface is responsible for creating a program, managing an existing program, deleting a program, and the like. The program editing interface mainly includes the configuration of the program window, the configuration of the time duration of playing, the configuration of the program type, a configuration of a command of "continuously playing the plurality of programs", the configuration of circularly playing the program, a configuration of deleting or adding program contents or the like.

The playing control module 112 performs a program management procedure, specifically, for example, creating a new program, setting the pixel resolution of the program window according to the resolution of the spliced display screen, newly creating a page on the program management interface, and uploading program materials to the newly created page from local, wherein the program materials may include a plurality of types of files such as pictures, videos, texts, presentation files PPT, documents DOC and the like. Positions, resolutions and the time duration of playing the materials in the spliced display screen are adjusted; a page is continuously to be newly created or a program is stored;

and a playing button on the program management interface is clicked, to send the program to the spliced display screen through the HDMI. After the playing is finished, a deleting button on the program management interface may be clicked to delete the program that has been played.

The playing control module in the embodiment of the present disclosure may be deployed on various playing control devices, and with the program management interface and the program editing interface, a user can conveniently and uniformly manage the programs to be played on the spliced display screen, and the user can conveniently use the spliced display screen. In addition, the control system for the spliced display screen provided by the embodiment of the present disclosure can simultaneously solve the problems of producing and displaying the program through a cooperative control of the playing control module and the spliced display screen, and can be applied to various spliced display screens.

It should be understood that the above embodiments are merely exemplary embodiments adopted to explain the principles of the present disclosure, and the present disclosure is not limited thereto. It will be apparent to one of ordinary skill in the art that various changes and modifications may be made without departing from the spirit and scope of the present disclosure, and such changes and modifications also fall within the scope of the present disclosure.

What is claimed is:

1. A display method for a spliced display screen, wherein the spliced display screen comprises a plurality of display panels spliced with each other, at least one display panel comprises a plurality of display regions; and the method comprises:

sampling frame image data in a video frame sequence according to a preset sequence order, and after each frame of frame image data is sampled, performing a gray scale compensation on sampled current frame image data, so as to obtain compensated frame image data;

the performing a gray scale compensation on sampled current frame image data, so as to obtain compensated frame image data comprises:

determining initial gray scale compensation data according to first gray scale data of a pixel in the current frame image data and a pre-generated gray scale compensation data table; wherein the gray scale compensation data table comprises compensation gray scale data of gray scales in a preset gray scale range and a pre-configured temperature adjustment parameter of the spliced display screen, and the temperature adjustment parameter configured for the spliced display screen varies with the spliced display screen;

determining a gray scale compensation coefficient of each display region;

determining target gray scale compensation data according to the gray scale compensation coefficient and the initial gray scale compensation data; and performing the gray scale compensation on the current frame image data according to the target gray scale compensation data to obtain the compensated frame image data.

2. The method of claim 1, wherein determining the initial gray scale compensation data for a pixel comprises:

processing sub-pixels of the pixel in the current frame image data according to a pre-stored ratio of heating capacities of the sub-pixels of the pixel, to determine the first gray scale data; and searching for the compensation gray scale data corresponding to the first gray scale data from the gray scale compensation data table according to the first gray scale data, and adjusting the compensation gray scale data by using the temperature adjustment parameter, to determine the initial gray scale compensation data.

3. The method of claim 1, wherein determining the initial gray scale compensation data for each display region comprises:

performing a region division on at least one display panel according to preset resolution information of the display panel to obtain each display region;

determining time domain weighted gray scale data of the display region according to the first gray scale data of each display region and a pre-configured time domain weighted coefficient corresponding to at least one frame of historical frame image data; wherein the time domain weighted gray scale data represents an influence of the at least one frame of historical frame image data of the display region on a gray scale of the current frame image data;

determining spatial domain weighted gray scale data of the display region according to a preset convolution kernel and the time domain weighted gray scale data; wherein the convolution kernel comprises a coefficient representing a thermal diffusion of each display region within a preset region into a surrounding region; and the spatial domain weighted gray scale data represents an influence of other surrounding display regions on a gray scale of the display region with the display region serving as a center; and determining the gray scale compensation coefficient of the display region according to the spatial domain weighted gray scale data.

4. The method of claim 3, wherein the determining time domain weighted gray scale data of the display region according to the first gray scale data of each display region and a pre-configured time domain weighted coefficient corresponding to at least one frame of historical frame image data comprises:

determining region gray scale data of each display region according to the first gray scale data of the pixel and each display region;

determining time domain temperature influence data according to the region gray scale data and a pre-configured first non-linear factor; and weighting the time domain temperature influence data corresponding to each frame of historical frame image data by using the time domain weighted coefficient corresponding to each frame of historical frame image data to obtain the time domain weighted gray scale data of the display region.

5. The method according to claim 3, wherein the determining spatial domain weighted gray scale data of the display region according to a preset convolution kernel and the time domain weighted gray scale data comprises:

weighting the time domain weighted gray scale data of each display region in the preset region according to the convolution kernel, and determining the spatial domain weighted gray scale data of the display region.

6. The method of claim 3, wherein the determining the gray scale compensation coefficient of the display region according to the spatial domain weighted gray scale data comprises:

taking a difference between 1 and the spatial domain weighted gray scale data as the gray scale compensation coefficient of the display region.

7. The method of claim 1, wherein the determining target gray scale compensation data according to the gray scale compensation coefficient and the initial gray scale compensation data comprises:

taking the gray scale compensation coefficient of the display region as the gray scale compensation coefficient of a pixel in the display region; and determining the target gray scale compensation data of the pixel according to the gray scale compensation coefficient and the initial gray scale compensation data of the pixel; and the performing the gray scale compensation on the current frame image data according to the target gray scale compensation data to obtain the compensated frame image data comprises:

processing a first sub-pixel of the pixel by using the target gray scale compensation data to obtain the compensated frame image data.

8. A parameter determination method for a spliced display screen, comprising:

determining at least one of following parameters configured for the spliced display screen by using a customized reference spliced display screen: a ratio of heating capacities of sub-pixels in a pixel; a gray scale compensation data table; a first non-linear factor; a time domain weighted coefficient; and a convolution kernel.

9. The method of claim 8, wherein the ratio of heating capacities of the sub-pixels in the pixel comprises:

lighting the reference spliced display screen according to sub-colors of the sub-pixels, respectively, to obtain a temperature change of the reference spliced display screen for each sub-color; and normalizing the temperature change of the reference spliced display screen for each sub-color to obtain the ratio of heating capacities of the sub-pixels.

10. The method of claim 8, wherein determining the gray scale compensation data table comprises:

lighting the reference spliced display screen according to a first gray scale, and determining a first average temperature of the reference spliced display screen;

traversing gray scales in a preset gray scale range at the first average temperature, and determining first brightness information at each gray scale;

lighting the reference spliced display screen according to a second gray scale, and determining a second average temperature of the reference spliced display screen;

traversing the gray scales in the preset gray scale range at the second average temperature, and determining second brightness information at each gray scale;

after the first brightness information and the second brightness information meet a first preset condition, determining a first target gray scale corresponding to the first brightness information and a second target gray scale corresponding to the second brightness information, and taking a difference between the first target gray scale and the second target gray scale as compensation gray scale data of the second target gray scale;

determining a lowest temperature of the spliced display screen during the spliced display screen being lit according to the first gray scale;

determining a highest temperature of the spliced display screen during the spliced display screen being lit according to the second gray scale; and determining the temperature adjustment parameter according to the lowest temperature, the highest temperature, the first average temperature and the second average temperature.

11. The method of claim 10, wherein the determining the temperature adjustment parameter according to the lowest temperature, the highest temperature, the first average temperature and the second average temperature comprises:

taking a ratio of a first difference between the highest temperature and the lowest temperature to a second difference between the second average temperature and the first average temperature as the temperature adjustment parameter.

12. The method of claim 8, wherein determining the first non-linear factor comprises:

lighting a first region of the reference spliced display screen according to a first gray scale and a second region of the reference spliced display screen according to a second gray scale, wherein the first region and the second region are different from each other; and after a preset time duration, lighting the first region and the second region according to the second gray scale, adjusting the first non-linear factor, and determining the adjusted first non-linear factor after a display picture of the first region is consistent with a display picture of the second region.

13. The method of claim 8, wherein determining the time domain weighted factor comprises:

determining the time domain weighted coefficient according to time sequence information of a preset quantity of frames of the historical frame image data and a preset second non-linear factor.

14. The method of claim 8, wherein determining the convolution kernel comprises:

acquiring initial temperatures of P×P display panels in the reference spliced display screen before the P×P display panels are lit, wherein P is a positive integer;

performing a region division on at least one display panel, and lighting the display panel, serving as a target, at a center of the P×P display panels according to a second gray scale to obtain a third average temperature of each display region;

taking a difference between the third average temperature and the initial temperature as a temperature change of the display region; and normalizing a ratio of the temperature change of each display region to a maximum temperature change of the display region to obtain the convolution kernel.

15. A spliced display screen, comprising a gray scale compensation circuit configured to perform a gray scale compensation on display data in the spliced display screen, wherein the spliced display screen comprises a plurality of display panels spliced with each other; at least one display panel comprises a plurality of display regions; wherein the gray scale compensation circuit comprises a sampling module and a processor; the sampling module is configured to sample frame image data in a video frame sequence according to a preset sequence order to obtain current frame image data; and the processor is configured to determine initial gray scale compensation data according to first gray scale data of a pixel in the current frame image data and a pre-generated gray scale compensation data table, wherein the gray scale compensation data table comprises compensation gray scale data of gray scales in a preset gray scale range and a pre-configured temperature adjustment parameter of the spliced display screen, and the temperature adjustment parameter configured for the spliced display screen varies with the spliced display screen; determine a gray scale compensation coefficient of each display region; determine target gray scale compensation data according to the gray scale compensation coefficient and the initial gray scale compensation data; and perform the gray scale compensation on the current frame image data according to the target gray scale compensation data to obtain compensated frame image data.

16. The spliced display screen of claim 15, wherein the processor comprises an initial gray scale determination module, a compensation coefficient determination module and a gray scale compensation module;

the initial gray scale determination module is configured to determine the initial gray scale compensation data according to the first gray scale data of the pixel in the current frame image data and the pre-generated gray scale compensation data table;

the compensation coefficient determination module is configured to determine the gray scale compensation coefficient for each display region; and the gray scale compensation module is configured to determine the target gray scale compensation data according to the gray scale compensation coefficient and the initial gray scale compensation data; and perform the gray scale compensation on the current frame image data according to the target gray scale compensation data to obtain the compensated frame image data.

17. The spliced display screen of claim 16, wherein the initial gray scale determination module comprises a first gray scale determination unit and an initial gray scale determination unit;

for determining the first gray scale data of the pixel, the first gray scale determination unit is configured to process sub-pixels of the pixel in the current frame image data according to a pre-stored ratio of heating capacities of the sub-pixels, to determine the first gray scale data; and for determining the initial gray scale compensation data of the pixel, the initial gray scale determination unit is configured to search for the compensation gray scale data corresponding to the first gray scale data from the gray scale compensation data table according to the first gray scale data, and adjust the compensation gray scale data by using the temperature adjustment parameter, to determine the initial gray scale compensation data.

18. The spliced display screen of claim 16, wherein the compensation coefficient determination module comprises a region division unit, a time domain statistical unit, a spatial domain statistical unit and a compensation coefficient determination unit;

for determining the gray scale compensation coefficient of each display region, wherein the region division unit is configured to perform a region division on at least one display panel according to preset resolution information of the display panel to obtain display regions;

the time domain statistical unit is configured to determine time domain weighted gray scale data of each display region according to the first gray scale data of each display region and a pre-configured time domain weighted coefficient corresponding to at least one frame of historical frame image data; wherein the time domain weighted gray scale data represents an influence of the at least one frame of historical frame image data of the display region on a gray scale of the current frame image data;

the spatial domain statistical unit is configured to determine spatial domain weighted gray scale data of each display region according to a preset convolution kernel and the time domain weighted gray scale data; wherein the convolution kernel comprises a coefficient representing a thermal diffusion of each display region within a preset region into a surrounding region, and the spatial domain weighted gray scale data represents an influence of other surrounding display regions on a gray scale of the display region with the display region serving as a center; and the compensation coefficient determination unit is configured to determine the gray scale compensation coefficient of the display region according to the spatial domain weighted gray scale data.

19. The spliced display screen of claim 16, wherein the gray scale compensation module comprises a target gray scale determination unit and a gray scale compensation unit;

the target gray scale determination unit is configured to take the gray scale compensation coefficient of the display region as the gray scale compensation coefficient of a pixel in the display region and determine the target gray scale compensation data of the pixel according to the gray scale compensation coefficient and the initial gray scale compensation data of the pixel; and the gray scale compensation unit is configured to process a first sub-pixel of the pixel by using the target gray scale compensation data to obtain the compensated frame image data.

20. A control system for a spliced display screen, comprising the spliced display screen of claim 15 and a playing control module, wherein the playing control module is configured to adjust programs in a playing control interface in response to a management operation on the programs in the playing control interface, obtain edited programs in response to an editing operation on the programs in the playing control interface, and upload the edited programs to the spliced display screen.

* * * * *